United States Patent
Elmasri et al.

(10) Patent No.: US 11,477,315 B2
(45) Date of Patent: *Oct. 18, 2022

(54) CONTACT INFORMATION EXCHANGING AND CONTENT SYSTEM AND METHOD FOR NETWORKING AND MARKETING

(71) Applicant: Cardex Group Pty Ltd, Glenwood (AU)

(72) Inventors: Rafik Elmasri, Blacktown (AU); David Elmasri, Glenwood (AU); Juan Manuel Carvajal Millan, Kellyville (AU); Melad Barjel, Claremont Meadows (AU); Stephen Bell, Camperdown (AU); Charlie Barjel, St Clair (AU)

(73) Assignee: Cardex Group Pty Ltd., Glenwood (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/788,146

(22) Filed: Feb. 11, 2020

(65) Prior Publication Data

US 2021/0014349 A1    Jan. 14, 2021

Related U.S. Application Data

(63) Continuation of application No. 16/321,811, filed as application No. PCT/AU2017/050796 on Jul. 31, 2017, now Pat. No. 10,560,560.

(30) Foreign Application Priority Data

Jul. 29, 2016  (AU) ................................ 2016902988
Nov. 16, 2016  (AU) ................................ 2016904669

(51) Int. Cl.
*H04M 1/2757*  (2020.01)
*H04W 4/08*  (2009.01)
(Continued)

(52) U.S. Cl.
CPC ...... *H04M 1/2757* (2020.01); *G06Q 30/0251* (2013.01); *H04W 4/021* (2013.01); *H04W 4/08* (2013.01); *H04W 4/21* (2018.02)

(58) Field of Classification Search
CPC ..... H04M 1/2757; H04W 4/21; H04W 4/021; H04W 4/08; H04W 36/0061;
(Continued)

(56) References Cited

U.S. PATENT DOCUMENTS 8,005,904 B2  8/2011  Yokoyama et al.
8,914,024 B2  12/2014  Alharayeri
(Continued)

FOREIGN PATENT DOCUMENTS

CN    102780719 B    4/2015
KR    2016-0111193 A    9/2016
(Continued)

OTHER PUBLICATIONS

International Preliminary Report on Patentability, dated Sep. 14, 2018, for International Application No. PCT/AU2017/050796, 153 pages.

(Continued)

*Primary Examiner* — Charles N Appiah
*Assistant Examiner* — Frank E Donado
(74) *Attorney, Agent, or Firm* — Kunzler Bean & Adamson

(57) ABSTRACT

An application for storing on a server for download to a client device for executing on the client device. The client device comprising a processor executing steps for performing various functionalities including: •sharing entered contact information of a user with the client device of another person using the same or similar application when the respective client devices are in a prescribed proximity to each other, and that other person being able to reciprocate (Continued)

sharing of their entered contact information into their client device with the client device of the user; •viewing, optionally joining, and/or creating a meeting where contact information between the participants is shared by the client devices of users joining or engaged in the meeting; •a user accessing, viewing and/or searching a list of contact information objects captured by the client device of the user; •entering of profile data details associated with a user and storing these in the client device for the purposes of constituting contact information for sharing with the client device of another user operating the application.

9 Claims, 29 Drawing Sheets

(51) Int. Cl.
    *G06Q 30/02*     (2012.01)
    *H04W 4/21*     (2018.01)
    *H04W 4/021*     (2018.01)

(58) Field of Classification Search
    CPC . H04W 36/0085; H04W 36/08; H04W 36/30; H04W 84/045; H04W 36/36; H04W 16/32; H04W 36/0083; G06Q 30/0251
    USPC .......................................................... 455/415
    See application file for complete search history.

(56) References Cited

U.S. PATENT DOCUMENTS

| | | | |
|---|---|---|---|
| 9,204,257 B1 | 12/2015 | Mendelson | |
| 9,749,429 B1* | 8/2017 | Simkhai | ............... H04L 51/046 |
| 2004/0255034 A1 | 12/2004 | Choi | |
| 2005/0250552 A1 | 11/2005 | Eagle et al. | |
| 2008/0125148 A1 | 5/2008 | Zhao et al. | |
| 2011/0021219 A1 | 1/2011 | LeBlanc et al. | |
| 2011/0207436 A1 | 8/2011 | van Gent et al. | |
| 2012/0329475 A1 | 12/2012 | Ribaudo et al. | |
| 2014/0075385 A1* | 3/2014 | Wan | ................... G06Q 30/0601 |
| | | | 715/812 |
| 2014/0136312 A1 | 5/2014 | Saksena et al. | |
| 2014/0279014 A1 | 9/2014 | Roka et al. | |
| 2015/0058239 A1 | 2/2015 | Lenahan et al. | |
| 2015/0195399 A1 | 7/2015 | Way et al. | |
| 2015/0281878 A1 | 10/2015 | Roundtree et al. | |
| 2015/0317682 A1 | 11/2015 | Kayser et al. | |
| 2015/0351004 A1 | 12/2015 | Ko et al. | |
| 2016/0029356 A1 | 1/2016 | Bhanage et al. | |
| 2016/0142873 A1* | 5/2016 | Trivedi | ................... H04W 4/80 |
| | | | 455/456.1 |
| 2016/0292740 A1 | 10/2016 | Akhavan-Saraf et al. | |
| 2016/0316503 A1* | 10/2016 | Raphael | ................ H04W 76/11 |
| 2017/0006440 A1 | 1/2017 | Postrel | |
| 2017/0061490 A1 | 3/2017 | Ghahremani et al. | |
| 2017/0325275 A1* | 11/2017 | Tonsgard | ............... H04W 4/023 |
| 2018/0070208 A1 | 3/2018 | Alharayeri | |
| 2018/0103348 A1 | 4/2018 | Malone et al. | |

FOREIGN PATENT DOCUMENTS

| | | |
|---|---|---|
| WO | 2007/067958 A2 | 6/2007 |
| WO | 2016/053384 A1 | 4/2016 |
| WO | 2016/149473 A1 | 9/2016 |

OTHER PUBLICATIONS

International Search Report, dated Oct. 26, 2017, issued in corresponding International Application No. PCT/AU2017/050796, 9 pages.

* cited by examiner

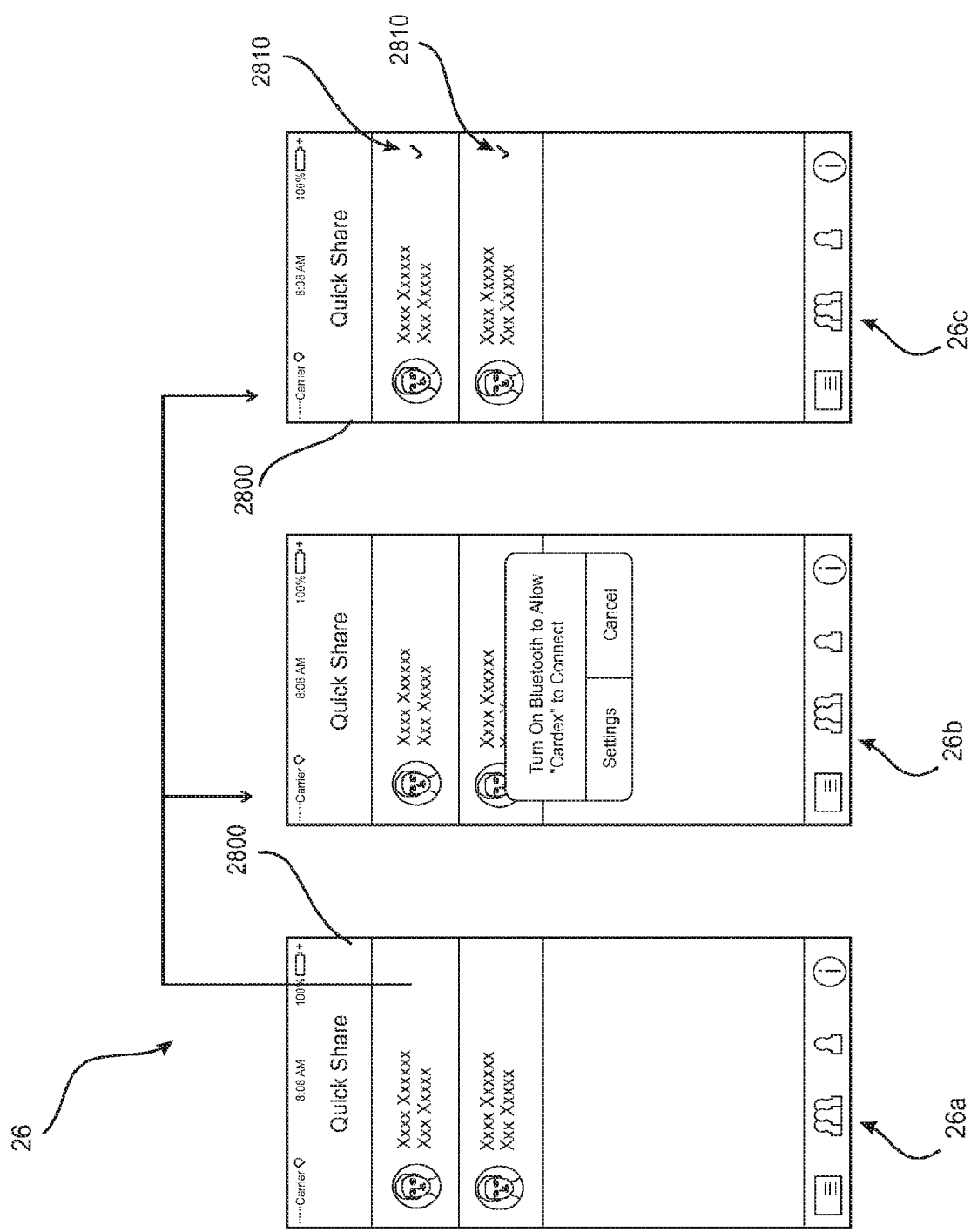

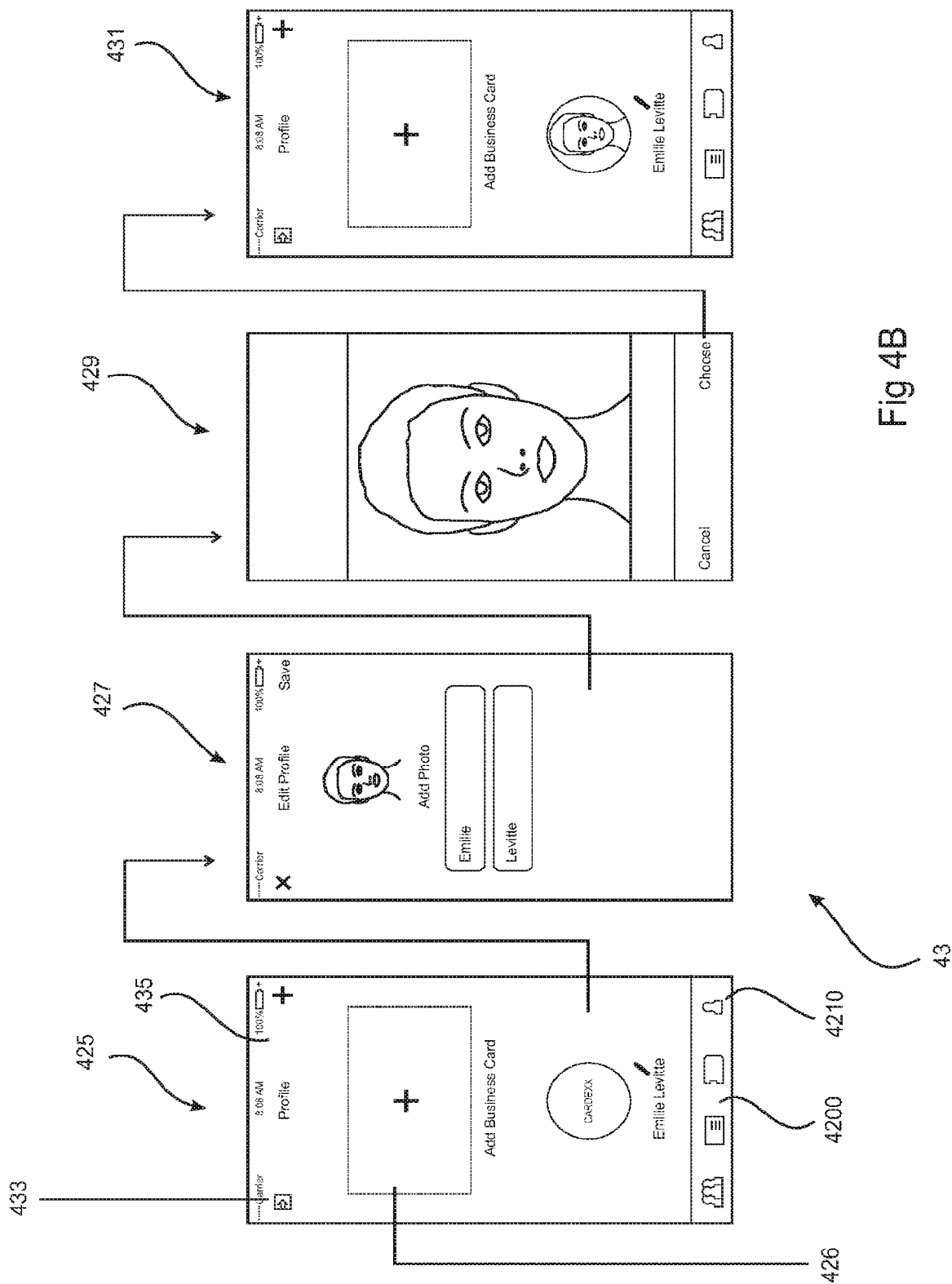

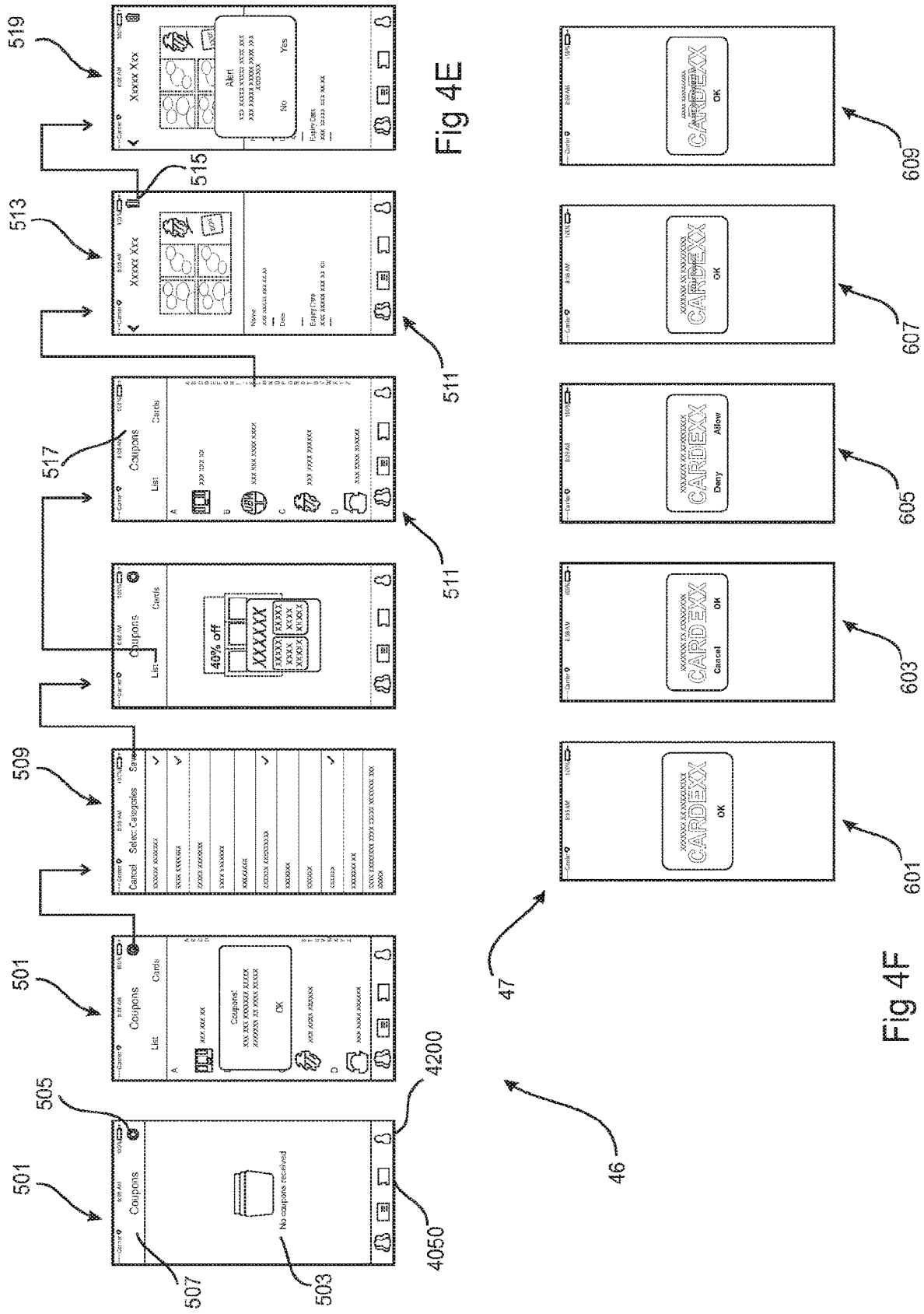

| Admins | Clients | Beacons | Users | Categories | | My details | Sign out |
|---|---|---|---|---|---|---|---|
| | | | | | | | Add admin |

| # | First name | Last Name | Email | | |
|---|---|---|---|---|---|
| 1 | Mead | Barjel | mbarjel@hotmail.com | Edit | Delete |
| 34 | Steve | Bell | steve@arbourlabs.com | Edit | Delete |
| 36 | Charlie | Barjel | charlie.barjel+cardex@gmail.com | Edit | Delete |

Pending invitations

You do not have any pending invitations.

Fig 5A

| Admins | Clients | Beacons | Users | Categories | | My details | Sign out |
|---|---|---|---|---|---|---|---|
| | | | | | | | Add a client |

Clients

Clients

| # | Client name | Contact Name | Contact Email | | | |
|---|---|---|---|---|---|---|
| 54 | John client | John Smith | stephen.david.bell@gmail.com | View | Edit | Delete |
| 55 | Terrence client | Terrence McClientson | terry@client.com | View | Edit | Delete |
| 56 | Arbour Labs | Melad Barjel | melad@snepo.com | View | Edit | Delete |
| 58 | Petra | Raf Elmasri | raf@petracontruction.com.au | View | Edit | Delete |

Fig 5B

Admins | Clients | Beacons | Users | Categories					My details  Sign out

Add a client

Clients / Add a new client

*First name
[                    ]

*Last name
[                    ]

Email
[                    ]

Company name
[                    ]

[ Create Client ]

Fig 5C

Admins | Clients | Beacons | Users | Categories     My details   Sign out

Beacons

[Add admin]

Beacons

| # | Serial # | Client name | | |
|---|---|---|---|---|
| 2 | 0117C598BE36 | Melad Barjel | [Edit] | [Delete] |
| 1 | AAAABBBBCCCCDDDD | Raf Elmasri | [Edit] | [Delete] |
| 4 | 0117C5967AD6 | Raf Elmasri | [Edit] | [Delete] |
| 3 | 0117C5967AD5 | Harbourside Pyrmont | [Edit] | [Delete] |

Fig 5D

Admins | Clients | Beacons | Users | Categories

My details    Sign out

Add a beacon

Beacons / Add a beacon

* Nme

* Serial number

Client

Select a Client....

* Major

* Minor

[ Create a Beacon ]

Fig 5E

| Beacons | Cardex cards | Coupons | | My details | Sign out |

Beacons

Beacons

| # | Name | |
|---|---|---|
| 2 | Charlie test beacon | [Edit] |

Fig 5F

| Beacons | Cardex cards | Coupons | | My details | Sign out |

Edit beacon 0117C596BE36

Beacons / Charlie Test Beacon

*Name

[ Charlie Test Beacon ]

Sent Cardex

[ Melad ▾ ]

The Cardex to push when a device detects this beacon

Push message

[ Hey...lets chat! ]

☑ Saves to contacts

Your details will be saved to the contact list of detecte users

☑ Receives cardexes

This beacon requests cardex cards be submitted

[ Update Beacon ]

Fig 5G

| Beacons | Cardex cards | Coupons | | My details  Sign out |

Cardex cards

[Add card]

Cardexes

| # | Name | | |
|---|------|---|---|
| 77 | Melad | Edit | Delete |

Fig 5H

| Beacons | Cardex cards | Coupons | | My details | Sign out |

Coupons

Coupons

| # | Name | | |
|---|---|---|---|
| 2 | Cheap Pizza | Edit | Delete |
| 1 | Savers Package | Edit | Delete |

Add a coupon

| Beacons | Cardex cards | Coupons | | My details | Sign out |

Fig 51

Add a coupon

Coupon / Add a coupon

*Name

Description

Expires at

2016 ▼  November ▼  2 ▼ — 11 ▼ : 16 ▼

Image
Choose File  No file chosen

Beacons

☐ Charlie Test Beacon

Categories

☐ Woman's apparel
☐ Men's apparel
☐ Unisex apparel
☐ Kids apparel
☐ Services
☐ General merchandise

Fig 5J

CONTACT INFORMATION EXCHANGING AND CONTENT SYSTEM AND METHOD FOR NETWORKING AND MARKETING

TECHNICAL FIELD

The present invention relates to systems and methods for electronic facilitation of exchanging personal and business contact information and utilising such information as a springboard for propagating and distributing digital content selectively amongst users and clients. The invention has particular, although non-exclusive, utility for facilitating networking and content marketing independently of conventional social media networks, and also for customising content marketing, advertising and sales opportunities for businesses and organisations, and also notifications of any kind, using smart devices.

Throughout the specification, unless the context requires otherwise, the following words have the specified meanings:

"card" or variations of such, means a record of a data file containing contact information of a particular user or prospective user or entity of the system;

"box" or variations of such, means a device associated with a client that can function as a beacon;

"cardex" or variations of such, means a data file comprising one or more records or cards of contact information of a user or prospective user of the system, which may be a client, the records or cards being stored on a repository located on: (i) a user device; or (ii) a server such as in a database of, or associated with, the server; or (iii) both.

"category" or variations such as "categories" are a form of filtering to designate different types or kinds of good(s) or service(s) that a user may be interested in purchasing or acquiring and which may be supplied by a client, and wherein the use of such term or terms is deemed to also including within its scope a "sub-category" or "sub-categories" belonging to, or falling within the general sphere of being a sub-class of a category or categories;

"comprise" or variations such as "comprises" or "comprising", will be understood to imply the inclusion of a stated integer or group of integers but not the exclusion of any other integer or group of integers;

"client" means a merchant or service provider of the system or user of the methodology of the invention, who is desirous of propagating and distributing digital content for the purposes of marketing, advertising and sales promotion of a business or organisation with which the client is associated;

"content" means any type of information including coupon marketing, advertising and sales information as well as notifications such as emergency or security alarms and warnings, or customised information such as may be associated with the Internet of Things applications;

"smart device" means a personal portable computer device such as a smartphone, tablet, notebook, laptop, convertible, or other 'intelligent' device that incorporates a programmable microprocessor, memory and communication interface that is capable of wireless communication with a server via a network such as the Internet;

"user" means a target user of the system and methodology, who is desirous of establishing a store of contact information on a smart device for business or other purposes, and who may be interested in receiving content from a client'

BACKGROUND

The following discussion of the background art is intended to facilitate an understanding of the present invention only. It should be appreciated that the discussion is not an acknowledgement or admission that any of the material referred to was part of the common general knowledge as at the priority date of the application.

The simple act of sharing business contact information, specifically name and address information in the context of meetings or a networking environment, has conventionally been achieved by exchanging business cards between participants.

Various electronic solutions have been proposed to supplant this time honoured, though somewhat outdated, approach with limited success.

Existing solutions that have focussed on mediating an exchange of contact information in electronic form between participating parties have proved cumbersome.

Social media platforms with a focus on business networking, such as LinkedIn, are generally popular but not well suited to this particular application.

However, the pervasiveness of the Internet and smart devices with the advent of digital marketing has seen a whole variety of new marketing and advertising strategies developed to target the customer. These include content marketing, social networking tools specifically developed to take advantage of social media platforms, mobility tools taking advantage of customer location and check-in, retargeting or remarketing using cookie tracking and community building techniques to create a like-minded market.

SUMMARY OF INVENTION

An objective of one aspect of the disclosed system or methodology of the present invention is to provide for the exchange of contact information between users and generate a store of such information for access by a use.

An objective of another aspect of the disclosed system or methodology of the invention is to provide for propagating and distributing digital content such as marketing, advertising or sales information by clients amongst users of the system or methodology.

An objective of a further aspect of the disclosed system or methodology of the invention is to integrate the exchange of contact information between users for generating a store of such information for the purposes of springboarding the propagation and distribution of digital content by clients amongst users.

The various aspects of the present invention arise from a recognition that sharing personal or business contact information in a face-to-face meeting or proximal encounter between participants in the meeting can be facilitated by a structured protocol for sharing such information, mediated by intelligence embedded in smart devices of the participants, who are, or can become, users of the system and methodology, and then using the data arising from such sharing to populate a database of users whom can be the beneficiaries of digital content customised by clients of businesses and organisations to market, advertise or promote their businesses or organisations.

In one embodiment of the invention, an app, as described herein, is intended to be used by participants, a term synonymous with 'users', who may interchangeably fulfil different roles according to context, such as host and actor, of any particular meeting.

Accordingly, one aspect of the present invention is more specifically defined by providing an application for storing on a server for download to a smart device of a user for executing on said smart device, the smart device comprising a processor executing steps for performing functionality comprising sharing entered contact information of a user with the smart device of another person, using the same or similar application when the respective smart devices are in a prescribed proximity to each other, and that other person being able to reciprocate sharing of their entered contact information in their smart device, with the smart device of the user.

Preferably, the application including the processor further executing steps for performing functionality comprising viewing, optionally joining, and/or creating a meeting where contact information between the participants is shared by the smart devices of users joining or engaged in the meeting.

Preferably, the application including the processor further executing steps for performing functionality comprising a user accessing, viewing and/or searching a list of contact information objects captured by the smart device of the user.

Preferably, the processor further executing steps for performing functionality comprising the entering of profile data details associated with a user and storing these in the smart device for the purposes of constituting contact information for sharing with the client device of another user operating the application.

In accordance with another aspect of the present invention, there is provided a beacon compatible hardware transmitter for emulating a user device executing the application as defined in the preceding aspect of the invention, including communicating contact information associated with a user of the beacon to a smart device of a user in the prescribed proximity to the transmitter.

In accordance with a further aspect of the present invention, there is provided a smart device including the application as claimed in any of the preceding aspects of the invention.

In accordance with another aspect of the present invention, there is provided a contact information exchanging system for networking including a server and smart device as defined in any of the preceding aspects of the invention for executing the steps.

In accordance with still a further aspect of the present invention, there is provided a method for networking comprising the steps as defined in any one of the preceding aspects of the invention.

In accordance with still another aspect of the invention, there is provided a contact information exchanging and content system for networking including:
smart devices for users and clients, each smart device having: a user interface for communicating with an operator of the smart device, a network interface for communicating with a computer network, a processor for operating an application, and a store;
a server; and
a box associated with a client, having a beacon protocol to broadcast a client identifier to a nearby smart device of a user (user device) and selectively cause content to be pushed to the user device;
the store of a user device being designed to store: (i) contact information related to the user of the user device, (ii) contact information of other user devices having the application, and (iii) selectively received content pushed by a client;
the application of a user device having:
(a) contact functionality to:
(i) generate and store the user contact information via the user interface;
(ii) receive and store the contact information of another user via the network interface; and
(iii) communicate the user contact information via the network interface to the server interface for processing by the engine to form a contact information data file and store the contact information data file in the database; and
(b) content functionality to:
(i) selectively receive client identifiers; and if so
(ii) selectively receive and store content pushed to the user device; and
(iii) communicate the stored content via the network interface to the server interface for processing by the engine to form a content data file and store the content data file in the database;
the application of the smart device of a client (client device) having functionality to:
(i) generate client content for receipt by a user device; and
(ii) communicate the client content via the communication means to the interface for processing by the engine to form a content data file and store the content data file in the database;
the engine being programmed to:
(i) receive the user contact information and client content from the interface and respectively process same to form a corresponding contact information data file and content data file, as appropriate and store the corresponding data files in the database;
(ii) communicate received contact information to all other user devices storing the same via the server interface.

Preferably, the engine is programmed to communicate received content to all boxes of a client associated with the content for a box to selectively push the received content to a user device accepting a client identifier.

Preferably, the engine is programmed to push selected content to user devices accepting a client identifier from a box.

Preferably, contact functionality includes one or more of:
(i) card exchanging;
(ii) meetings;
(iii) quick share.

In accordance with another aspect of the present invention, there is provided an application for a smart device of a user (user device) having: a user interface for communicating with an operator of the smart device, a network interface for communicating with a computer network, a processor for operating the application, and a store; including:
(a) contact functionality to:
1. generate and store the user contact information via the user interface;
2. receive and store the contact information of another user via the network interface; and
3. communicate the user contact information via the network interface to a server interface for processing to form a contact information data file and store the contact information data file in a database; and
(b) content functionality to:
1. selectively receive client identifiers from a box associated with a client, the box having a beacon protocol to broadcast a client identifier to the user device when it is nearby the box;
2. selectively receive and store content pushed to the user device upon accepting the client identifier; and
3. communicate the stored content via the network interface to the server interface for processing by the engine to form a content data file and store the content data file in the database. contact functionality to:

In accordance with a further aspect of the present invention, there is provided a smart device for a user (user device) including:
a user interface for communicating with an operator of the user device,
a network interface for communicating with a computer network,
a processor for operating an application, and
a store;
wherein the application includes:
(a) contact functionality to:
1. generate and store the user contact information via the user interface;
2. receive and store the contact information of another user via the network interface; and
3. communicate the user contact information via the network interface to a server interface for processing to form a contact information data file and store the contact information data file in a database; and
(b) content functionality to:
1. selectively receive client identifiers from a box associated with a client, the box having a beacon protocol to broadcast a client identifier to the user device when it is nearby the box;
2. selectively receive and store content pushed to the user device upon accepting the client identifier; and
3. communicate the stored content via the network interface to the server interface for processing by the engine to form a content data file and store the content data file in the database.

A server including:
an engine associated with a database for storing data files of contact information sourced from user smart devices and content sourced from client smart devices, and a server interface for communicating with the smart devices and a box over the computer network;
the smart devices having a user interface for communicating with an operator of the smart device, a network interface for communicating with a computer network, a processor for operating an application, and a store;
the application of a user smart device having
(a) contact functionality to:
1. generate and store the user contact information via the user interface;
2. receive and store the contact information of another user via the network interface; and
3. communicate the user contact information via the network interface to the server interface for processing by the engine to form a contact information data file and store the contact information data file in the database; and
(b) content functionality to: selectively receive client identifiers; and if so
1. selectively receive client identifiers; and if so
2. selectively receive and store content pushed to the user device; and
3. communicate the stored content via the network interface to the server interface for processing by the engine to form a content data file and store the content data file in the database;
the application of a client smart device having functionality to:
(a) generate client content for receipt by a user device; and
(b) communicate the client content via the communication means to the interface for processing by the engine to form a content data file and store the content data file in the database;
wherein the engine is programmed to:
(a) receive the user contact information and client content from the interface and respectively process same to form a corresponding contact information data file and content data file, as appropriate and store the corresponding data files in the database; and
(b) communicate received contact information to all other user devices storing the same via the server interface.

A method for networking contact information and content, including:
in a user device, storing: (i) contact information related to the user of a user device, and (ii) contact information of other user devices,
receiving contact information of another user in exchange for supplying contact information of the user of the user device;
selectively receiving content pushed by a client;
broadcasting a client identifier to a nearby user device; and
selectively causing content to be pushed to a user device accepting the client identifier.

BRIEF DESCRIPTION OF DRAWINGS

The invention will be better understood having regard to the best mode for carrying out the invention, which is described with reference to the following drawings, wherein:—

FIGS. 2A to 2F depict different series of mockup flow maps for a user device representative of a user experience of an App designed according to a first embodiment of the present invention in respect of each of the functionalities provided by the App, wherein:

FIG. 2A depicts the mockups for the START functionality;

FIG. 2B depicts the mockups for the ABOUT functionality;

FIG. 2C depicts the mockups for the PROFILE functionality;

FIG. 2D depicts the mockups for the BUSINESS CARDS functionality;

FIG. 2E depicts the mockups for the MEETINGS functionality;

FIG. 2F depicts the mockups for the QUICK SHARE functionality;

FIGS. 3A to 3E are system architecture diagrams showing the relationship and structure of the various entities that make up the system, wherein:

FIG. 3A is a schematic drawing showing the principal hardware components of the contact information exchanging system of both embodiments, but specifically identifying the contact information system as part of the server in accordance with the second embodiment;

FIG. 3B is a structure diagram of the categories coupons system;

FIG. 3C is a structure diagram of the overall system;

FIG. 3D is a structure diagram of the category use system;

FIG. 3E is a structure diagram of the user registration login and create card system;

FIGS. 4A to 4F depict different sets of mockup flow maps for a user device representative of user experience of the App designed according to a second embodiment in respect of various functionalities of the App, wherein:

FIG. 4A depicts the mockups for the START functionality and some of the PROFILE functionality;

FIG. 4B depicts the mockups for the remainder of the PROFILE functionality;

FIG. 4C depicts the mockups for the BUSINESS CARDS functionality;

FIG. 4D depicts the mockups for the MEETINGS functionality and QUICK SHARE facility;

FIG. 4E depicts the mockups for the COUPONS functionality;

FIG. 4F depicts the mockups for various notification messages sent by the App depending upon the COUPONS functionality and QUICK SHARE facility;

FIGS. 5A to 5J depict different pages provided by the content management system for allowing different users of same to configure settings, wherein FIG. 5A depicts the Administrator user page for Admins configuration;

FIG. 5B depicts the Administrator user page for Clients configuration;

FIG. 5C depicts the Administrator user page for Add a client configuration;

FIG. 5D depicts the Administrator user page for Beacons configuration;

FIG. 5E depicts the Administrator user page for Add a beacon configuration;

FIG. 5F depicts the Client user page for Beacons configuration;

FIG. 5G depicts the Client user page for Edit beacon configuration;

FIG. 5H depicts the Client user page for Contact sharing configuration;

FIG. 5I depicts the Client user page for Coupons configuration;

FIG. 5J depicts the Client user page for Add a coupon configuration;

FIGS. 6A to 6D are sequence diagrams showing the program flow between entities for different functionalities, wherein FIG. 6A is a sequence diagram of the meeting functionality flow;

FIG. 6B is a sequence diagram of the quick share functionality flow;

FIG. 6C is a sequence diagram of the user coupons functionality flow;

FIG. 6D is a sequence diagram of the clients coupons categories sequence flow;

BEST MODE FOR CARRYING OUT THE INVENTION

The best mode for carrying out the invention is directed towards a contact information exchanging and content marketing system and method for networking and marketing, as shown in FIGS. 1 and 2.

A first embodiment of the best mode is characterised by an App, involving processing steps to be run by a smart device, the App being able to be shared in the sense of being separately downloaded by user and client smart devices and the processing steps being selectively executed between co-operating user smart devices executing the App. More broadly, the App is delivered by a computer platform implemented using discrete computer systems arranged in a network architecture, as described in further detail below. Operational aspects of this networked computer hardware are implemented using software variously co-operatively deployed across the computer systems, as also described in further detail below.

Network Architecture

Figure 1A:
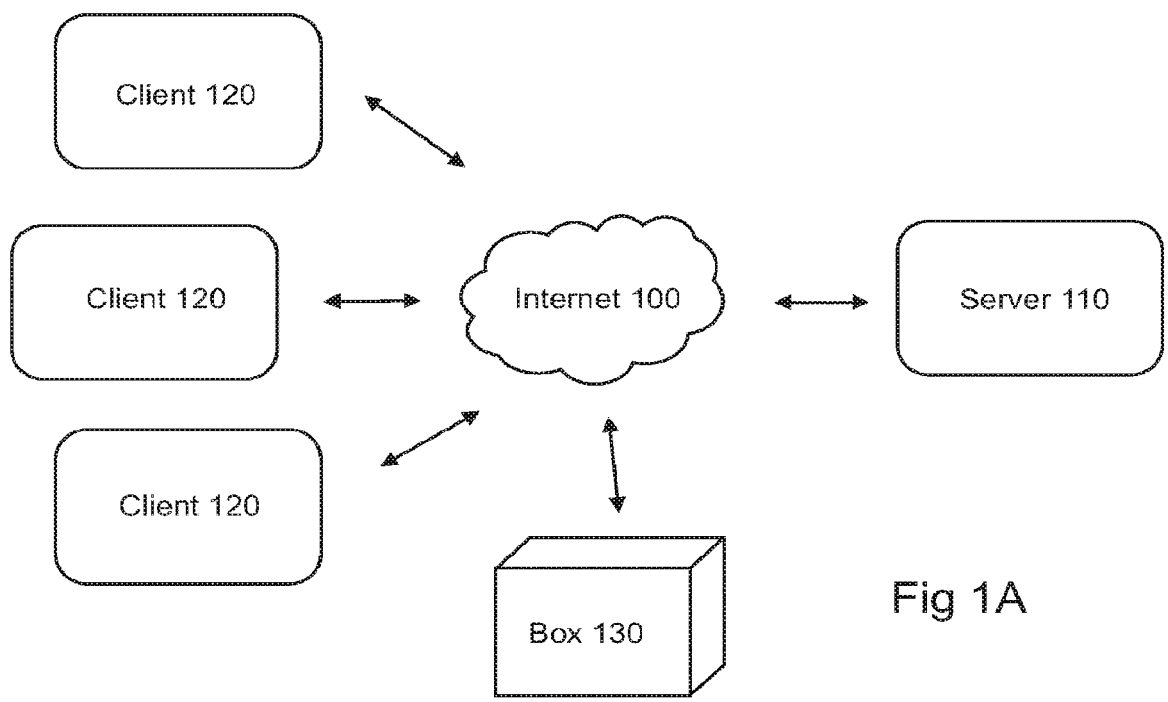
FIG. 1A depicts a generic network architecture used generally by embodiments of the present invention.
Figure 1B:
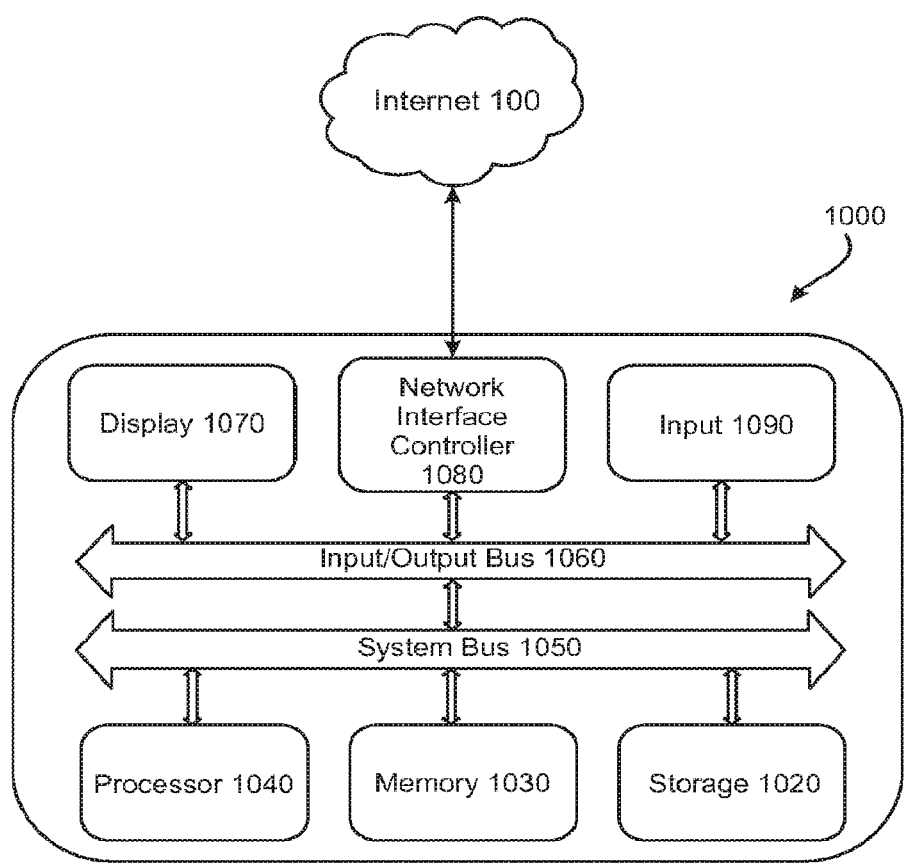
FIG. 1B depicts in schematic form a generalised hardware architecture of a computer system, as relied upon by the devices referred to in FIG. 1A.

FIGS. 1A and 1B depict a network architecture used to implement the described platform, which uses a client-server architecture as broadly understood by those skilled in the relevant technical field. This architecture comprises a server network 110 notionally including a server interface for receiving requests from and serving responses to multiple user devices 120 of users, clients and administrators of the system via the Internet 100, a process engine and a database.

The server network 110, collectively referred to as a server, is hosted by a dedicated workstation, and is conceptually arranged as a network of multiple interconnected servers—including a WebSocket server, an App application server and a database server. The server network 110 is implemented using a virtual web server operating a virtual web service such as provided by Amazon Web Services, Inc. This service offers scalability, clustering, fallover, load balancing and other infrastructure-level features which may be particularly desirable. User devices 120 are smart devices—which rely upon web browsers or stand-alone Apps or applications installed within respective operating systems on these devices that incorporate a camera and interact with the server network 110.

The network architecture also includes a special user device referred to as a box 130. This is a customised hardware device that functions as a beacon 31 using a protocol, which in the present embodiment is iBeacon™. This protocol, when activated, broadcasts an identifier to nearby user devices 120 using Bluetooth low energy (BLE) and if the nearby user device is configured to receive and process same, permits the box to send one or more push notifications in the form of digital messages or content to facilitate marketing and advertising of a client service provider acquiring a box 130 for this purpose. The box and beacon functionality will be described in more detail later.

An important characteristic of the server network is that it is designed to permit updating of contact information and content marketing information across user and client devices virtually immediately, in real time.

The illustrated client-server architecture provides a distributed application structure that partitions tasks or workloads between the server network 110 and user devices 120. The server network 110 executes one or more server programs, which in effect share their resources with user devices 120. A user device 120 does not share its own resources in any material way, but instead requests content or a service function from the server network 110. User devices 120 initiate communications sessions with the server network 110, which awaits incoming requests and responds to user devices 120, using an implemented internet protocol stack over the Internet 100.

Computer System Architecture

As referred to above, preferred embodiments rely upon various computer systems used to implement the networked client-server architecture of FIG. 1A interoperating via the Internet 100.

FIG. 1B depicts a computer system architecture 1000 in schematic form, which is generic to various forms of user device 120 and server 110 as depicted in FIG. 1A. Whilst specific implementational details will of course vary quite considerably across specific computer systems, the underlying architecture is essentially system agnostic. An exemplary architecture is accordingly depicted and described, which may be considered illustrative of the different manifestations of the computer systems comprising the platform. Such computer systems may range from workstations and personal computers, through to laptops, tablets and smartphones, for example.

The exemplary computer system 1000 has principal components including a storage 1020, a memory 1030 including a store, and a processor 1040, each of which is interconnected via a system bus 1050. The system bus 1050 is operatively linked to an input/output bus 1060, which interfaces with a display 1070, input 1080, and a network interface controller 1090 or network interface. The network interface controller 1090 is configured to permit intercommunications with a network external of the computer 1000, namely the Internet 100 of FIG. 1A.

The storage 1020 provides a non-volatile data storage medium for storing application data and executable code, and is typically flash memory, or other data storage device such as a magnetic hard disk drive. The memory 1030 is a random-access memory used to load executable code and application data from storage 1020.

The processor 1040 executes instructions of a computer program loaded from memory 1030 by performing basic arithmetical, logical, control and input/output (I/O) operations encoded by the computer program. The processor 1040 comprises at least a central processing unit, and may be supported by ancillary processing units for performing specialist functions—such as dedicated graphics or numerical processing.

The display 1070 provides a visual window to the user, who can interact via input 1090. The input 1090 in the example of a personal computer or workstation comprises a keyboard and mouse. Alternatively, in the case of a tablet or smartphone the input 1090 comprises a touchscreen layered over the display 1070, which is responsive to input gestures.

The network interface controller 1080 provides a port for the computer system 1000 to communicate by transmitting data to and receiving data from the Internet 100, and implements electronic circuitry required to communicate using a specific physical layer and data link layer standard.

The network interface controller 1080 is configured to inter-operate using wired standards such as Ethernet, or Token Ring, or wireless standards such as provided by the IEEE 802.11 wi-fi standard or ITU-R 4G cellular standard. This provides a foundation for a full network protocol stack, which permits large-scale network communications through routable protocols, such as Internet Protocol (IP) over the Internet. Connection to the Internet 100 is typically mediated via a firewall server or proxy server.

As will become apparent from the description that follows, the network interface controller 1080 in instances of user devices 120 comprises a controller implementing a near-range and low-energy networking protocol, with appropriate supporting hardware. As exemplified, this is BLE.

Software Architecture

The client-server architecture implements a particular software design and architecture, distributed amongst both the server network 110 and user devices 120. Processing is conducted co-operatively as required, though principally at the servers 110, with some minimal processing executed at the user devices 120, which undertake local data caching and synchronisation with the server network 110.

An App application at a user device 120 comprises a presentation layer or user interface, an application layer, and a data layer all implemented by computer programs that are deployed and installed for executing. Model-view-controller (MVC) is a software architectural pattern for implementing user interfaces, and may be adopted as required.

App Functionality

The App of the present embodiment is computer application software downloaded from a distribution platform (not shown) for downloading Apps over the Internet 100. The downloadable App is suitable for storage and executing at a user device 120. Functionality of the App is described with particular reference to user interaction with the App in a storyboarded manner using mockup flow maps shown at FIGS. 2A to 2G.

These mockups form an approximate sequence of successive images displayed on a display of the user device 120 during executing of the App, as a user interacts with the user device 120, and as the user device 120 interacts with a co-operating user device 120 also executing the App.

As will be apparent, the user device 120 is a smart device executing a lightweight operating system—such as an Apple™ iPhone executing iOS or an android compatible smart device executing the Android™ operating system.

START

Figure 2A:
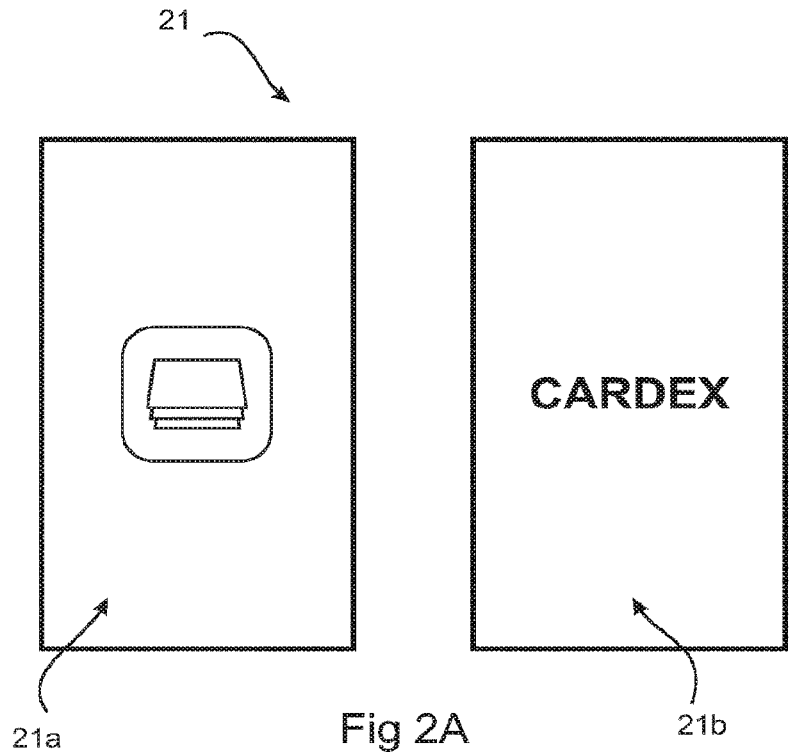

As shown in FIG. 2A the App is displayed on the user device 120 as an icon APP ICON 21*a*, which when clicked or tapped by a user is activated (that is, executing commenced) and a START functionality 21 is invoked on the user device 120, displaying a splash launch screen LAUNCH SCREEN 21*b*. The App is coded so that the launch screen then transitions to a main screen represented by the mockup 201, from which a number of different functionalities may be invoked. These include ABOUT 22, PROFILE 23, BUSINESS CARDS 24, MEETINGS 25 and QUICK SHARE 26 functionalities, which will be described in turn.

ABOUT

Figure 2B:
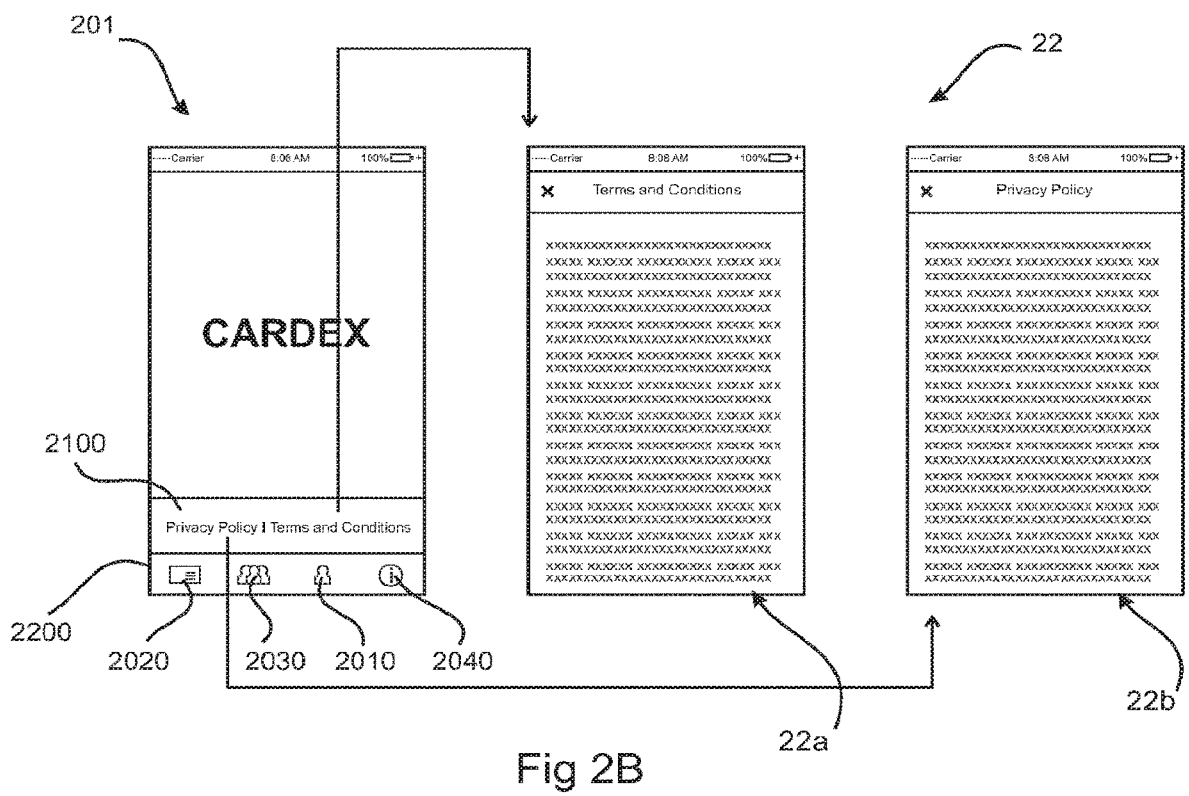

The ABOUT functionality 22 is a standard functionality for informing the user/purchaser of the privacy policy and terms and conditions associated with purchasing and use of the App. As shown in FIG. 2B, the main screen mockup 201 includes a bottom bar 2100 providing internal links labelled 'Privacy Policy' and 'Terms and Conditions' to respectively display a Privacy Policy screen represented by the PRIVACY POLICY mockup 22*a* and a Terms and Conditions screen represented by the TERMS AND CONDITIONS mockup 22*b*.

PROFILE

The PROFILE functionality 23 is invoked by activating the Profile icon 2010, which is provided upon a bottom toolbar 2200. The PROFILE functionality 23 provides the facility for the user as an object to enter their profile data details and have this stored in the user device 120 for the purposes of identifying them and providing their contact information as an object in the performance of the other functionalities that characterise the App.

Figure 2C:
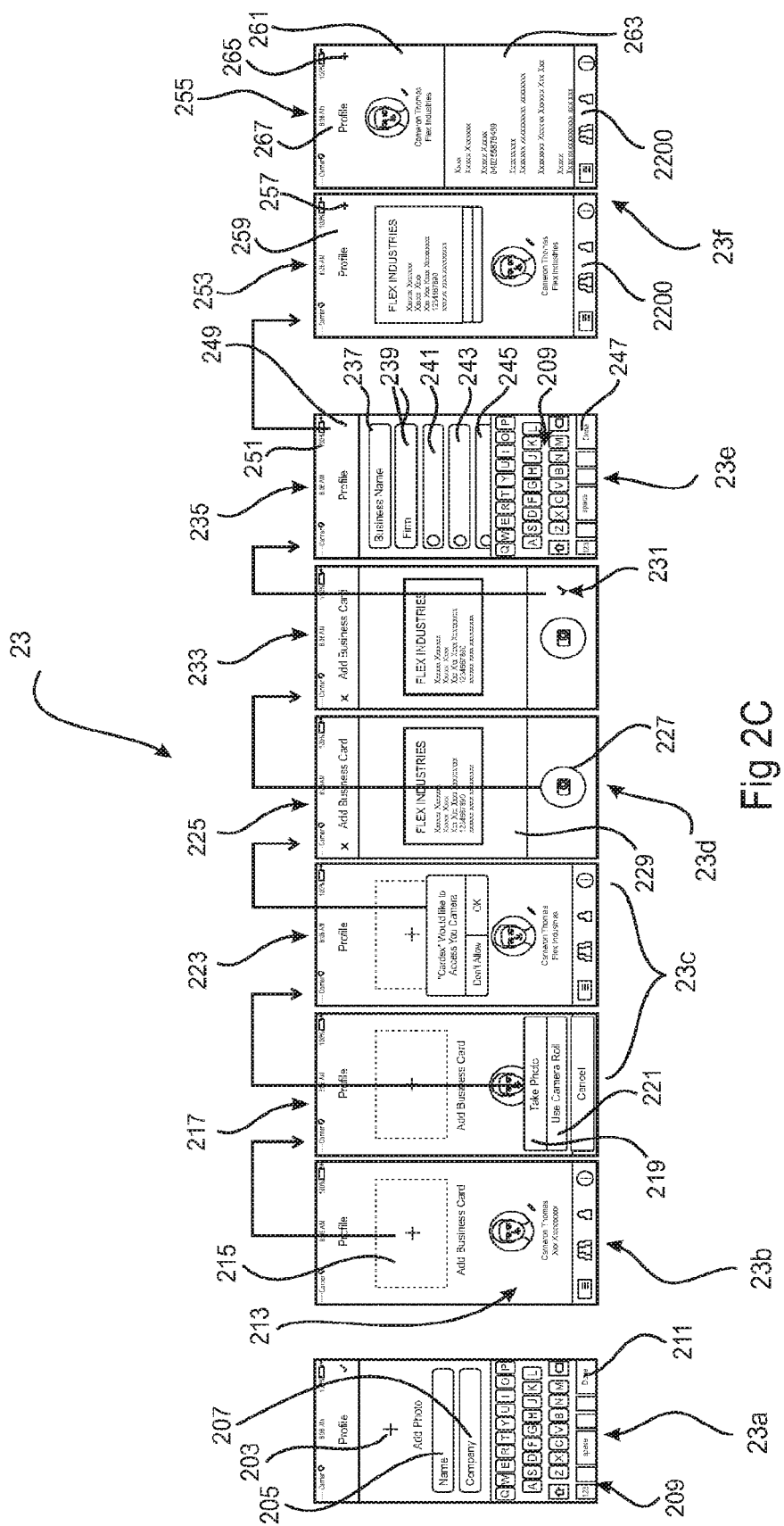

The App is coded so that a user who has not used the App before, upon tapping any of the functionalities provided by the remaining icons along the bottom toolbar 2200, automatically invokes the PROFILE functionality 23 and is prompted to populate a personal profile, principally comprising information that may be shared as business card information, as shown in FIG. 2C. In this way, the contact information of the user is entered before other functionalities of the App can be invoked.

As represented by the mockup CREATE PROFILE 23*a*, provision is made for the user to add simple contact information (SCI), in the present embodiment comprising a photograph of themselves, personal name details and company/business/organisation name details. The App is coded to enable this by tapping the area 203 and invoking a gallery to select an image of themselves or some object associated with them to constitute the photograph, entering personal name details directly into the field 205, and company name details directly into the field 207 via a haptic keyboard 209 presented on the lower half of the display. After this is completed and added by the user tapping the Done button 211, the PROFILE functionality 23 progresses to the next screen represented by the mockup ADD CARD 23b, where graphical information representative of the user is displayed in the lower half of the screen 213 and a facility for adding a business card of the user is provided at 215.

By tapping on the facility for adding a business card at 215, extended functionality represented by the mockups CAMERA ACCESS OR CAMERA ROLL SELECTION 23c is invoked, with firstly a screen 217 being displayed providing pop-up menus for taking a photo of the user's business card at tab 219 or using the camera roll stored in a gallery of the user device 120 at tab 221.

The PROFILE functionality 23 is coded to invoke further functionality for each of these options. As shown, upon asserting Take Photo at tab 219, a screen represented by the mockup 223 is displayed bringing up a dialogue box requesting access to the user camera. If asserted, the App is coded to display the TAKE PHOTO screen 23d represented by the mockup 225, where provision is made for operating the camera by tapping area 227 and displaying an image viewed through the lens of the user device's camera in the top half 229 of the screen. Once the photograph of the business card is taken, it is stored at the prescribed location in the gallery of the user device 120, a tick symbol 231 is displayed in the lower right are of the screen, as represented in the mockup 233.

The App is coded to enable the stored image of the business card to be supplemented with textual data about the business card, which is entered by the user. This is achieved by the user tapping the tick symbol 231, which causes the App to advance by displaying an ADD INFORMATION screen 23e as represented in the mockup 235. The user is prompted in the screen to add simple Business Card contact information (BCCI) including the Business Name at field 237, the person role at field 239, the mobile number at field 241, the phone number at field 243 and the email address at field 245 using the haptic keyboard 209. The information is entered and stored in a list within the user device 120, together with the stored image, by asserting the Done button 247.

Once the user profile information has been entered, the profile information stored for the user can be accessed for viewing or editing by way of tapping a tick symbol 249 displayed on an upper tool bar 251 of the ADD INFORMATION screen 23e, or when at the main screen 201, by asserting the profile icon 2010 directly.

The App is coded to provide this further functionality by way of two screens as represented by the PROFILE COMPLETE mockups 23f. As shown, a business card image (BCI) screen represented by mockup 253 is invoked in response to tapping the tick symbol 249. The BCI screen displays the stored image of the Business Card in the top half of the screen and the previously entered SCI (simple contact information) in the bottom half of the screen. A BCCI screen represented by mockup 255 is invoked by tapping a + symbol 257 displayed in the top toolbar 259 of the BCI screen. The BCCI screen displays the SCI in the top half of the screen 261 and the stored textual BCCI in the bottom half of the screen 263. The BCI screen represented by the mockup 253 is invoked again by tapping a + symbol 265 displayed in the top toolbar 267 of the BCCI screen, so the two screens can be toggled between by tapping the respective + symbol 257 or 265.

The BCCI is editable via either screen by tapping on the SCI displayed in the respective screen.

In other embodiments, user profile details may be loaded or modified by a third party contacts App on the user device 120, or downloaded from a server, or accessed via an API from a third party social media platform. As will be appreciated, there are various methods by which populating a profile can be expediently and advantageously achieved.

Once a profile is populated, and stored in local storage on the user device 120, launching the App by tapping the icon on the APP ICON screen 21a, as shown in FIG. 2A, invokes the ABOUT functionality 22 and enables a user to activate any of the functionalities in the bottom toolbar 2200 without being diverted to the PROFILE functionality, unless they tapped the PROFILE functionality icon 2010.

BUSINESS CARDS

The BUSINESS CARDS functionality 24 is invoked by a user tapping on the Business Cards icon 2020 as represented in the main screen mockup 201. The BUSINESS CARDS functionality 24 provides the facility for a user to access, view and search a list of contact information objects in the form of cards captured by the user device 120 when making use of the App. Each contact information object is stored in the list within the user device having SCI, BCI and BCCI associated with it.

Figure 2D:
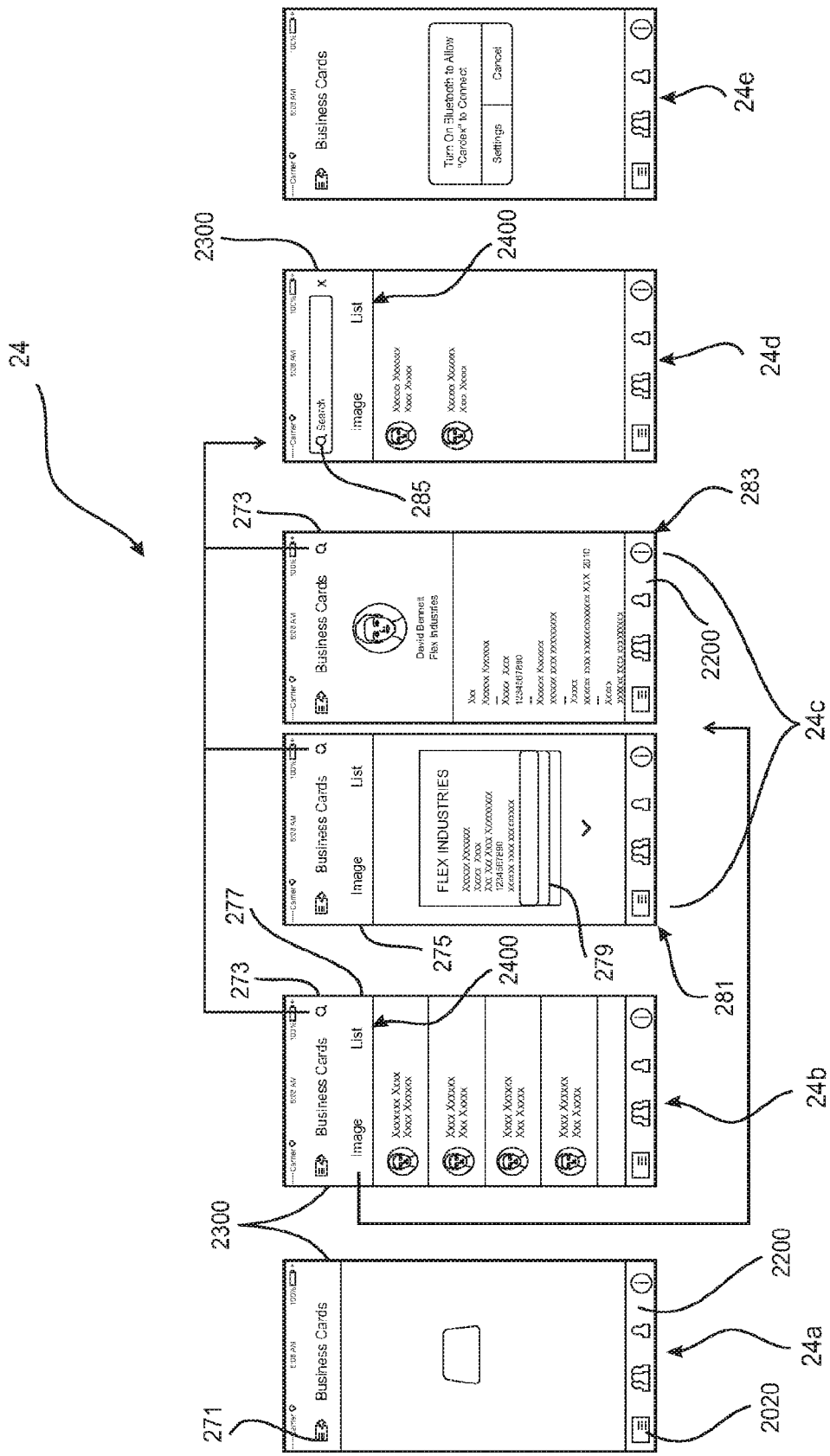

The BUSINESS CARDS functionality 24 is provided by way of the screens represented by the mockups in FIG. 2D. Common to all of the screens is the bottom toolbar 2200 and a title bar 2300 including a 'Quick Share' icon 271 defining an active area comprising an internal link for invoking the QUICK SHARE functionality 26, which will be described in more detail later.

When invoked for the first time, and before any of the remaining interactive functionalities are successfully performed, which involve interaction with user devices 120 of other uses of the App, the screen represented by the mockup NO CARDS 24a is displayed. At this stage, no business card information is stored in the App as an object. That is, no contact information associated with business cards of users of the App has been successfully shared with the user device 120 of this particular user.

Once contact information for business cards has been stored in the list by using one of the interactive functionalities (to be described in more detail later), then by default, a Business Cards content screen is invoked. This screen includes further widgets comprising a tab bar 2400 and a search icon 273 provided in the title bar 2300.

The tab bar 2400 can present either an image display or a list display of contact information captured by the user device 120 when using the App to perform any of the interactive functionalities for sharing contact information between different users of the App. As represented by the BUSINESS CARDS functionality mockups 24, the tab bar 2400 includes an image tab 275 or a list tab 277, which when respectively tapped, display a searchable image stack 279 of BCI or a list of SCI of captured contact information.

As represented by the VIEW CARDS BY LIST mockup 24b, when the list tab 277 is active, the list display of contact information objects captured by the user device 120 is displayed. The list display of contact information objects displays in a predetermined order (either chronologically or alphabetically) the SCI captured by and stored for that object in the list of the user device 120 as a consequence of the App being invoked and performing any of the interactive functionalities. A prescribed number of consecutive SCI's of captured objects in the list is displayed at any one time, and the list can be scrolled through to reveal successive SCI's of consecutive objects in the list in conventional manner.

Alternatively, as represented by the VIEW CARDS BY IMAGE mockup 281, when the image tab 275 is active, the image display of contact information captured by the user device 120 is displayed as an object. The image display of contact information displays the stack 279 of BCI, where, in the present embodiment, only the top BCI of an object is actually displayed in the stack and the remaining BCI of consecutive objects in the stack is represented by a graphical image of business card edges surmounted by the top BCI. An arrow icon below the stack 279 is also displayed, which includes an active area when tapped, invoking a process that sequentially displays successive BC's of consecutive objects indexed within the stack, where the BCI of the currently indexed object is displayed as the top BCI of the stack.

The App is coded to provide extended functionality by making the top BCI an active area. By tapping the displayed BCI, the SCI and BCCI associated with the BCI of the indexed object is displayed, as represented by the VIEW CARDS BY IMAGE mockup 283.

The captured contact information of each object in the list is linked between the list display and image display, so that a user may transition between the two. In the case of the list display, each SCI of an object comprises an active area, which when tapped, transitions to the corresponding image display, showing the BCI for the object of the indexed SCI, as the top BCI in the stack 279. The user may transition back to the list display by simply tapping the list tab 277 on the image display screen.

For example, a user tapping the SCI for the object 'David Bennett' of 'FLEX INDUSTRIES' in the list display as represented in the VIEW CARDS BY LIST mockup 24b is presented with the BCI of this object in the image display as represented in the mockup 281 of the VIEW CARDS BY IMAGE mockups 24c. The actual BCI displayed may be the actual photograph of the business card of the object captured or be an evocative image of a business card. A user may scroll down to access alternative BCI's of successive objects stored in the list image by tapping the arrow icon, changing the indexed object to the one associated with the displayed image.

When the user wishes to view the SCI and BCCI, associated with the indexed object corresponding to the top BCI, in this case 'David Bennett' of 'FLEX INDUSTRIES' they simply tap on the BCI and the corresponding SCI and BCCI of the indexed object is shown as represented by the VIEW CARDS BY IMAGE mockup 283.

The search functionality is activated by tapping on the search icon 273 within the title bar 2300 from within any of the list and image display screens. Upon activation, a search screen is display as represented by the SEARCH mockup 24d. The search screen changes the title bar to display a search box 285 and a progressive disclosure control X. A search using standard text into the into the search box 285 can then be undertaken of the list of stored objects and hits displayed, either using the list display by activating the list tab 277, where the SCI's of the selected objects are displayed, or using the image display by activating the image tab 275, where the BCI's of the selected objects are displayed.

In the example shown, the search term 'flex' (not shown) has been entered in the search box 285, and two objects, namely 'Cameron Thorne' and 'David Bennett' have been hit and selected, with their SCI's displayed in the list display screen. A user may tap on the SCI for any of the displayed objects and transition to the image view of the object displaying the BCI, and from there selecting the SCI and BCCI for viewing by tapping the BCI of the indexed object.

Additional functionality is coded into the App to alert the user to turn-on the networking protocol, in the present case BLE, when it is switched off and interactive functionality is invoked. An alert screen as represented by the BLUETOOTH CONNECTION mockup 24e, as shown, is provided for this purpose.

MEETINGS

The MEETINGS functionality 25 is invoked by a user tapping on the Meetings icon 2030 as represented in the main screen mockup 201. The MEETINGS functionality 25 provides a facility for a user to view and join a meeting, where contact information between the participants is shared, or to create such a meeting where the contact information is subsequently shared by people joining the meeting, including the contact information of the meeting creator.

Figure 2E:
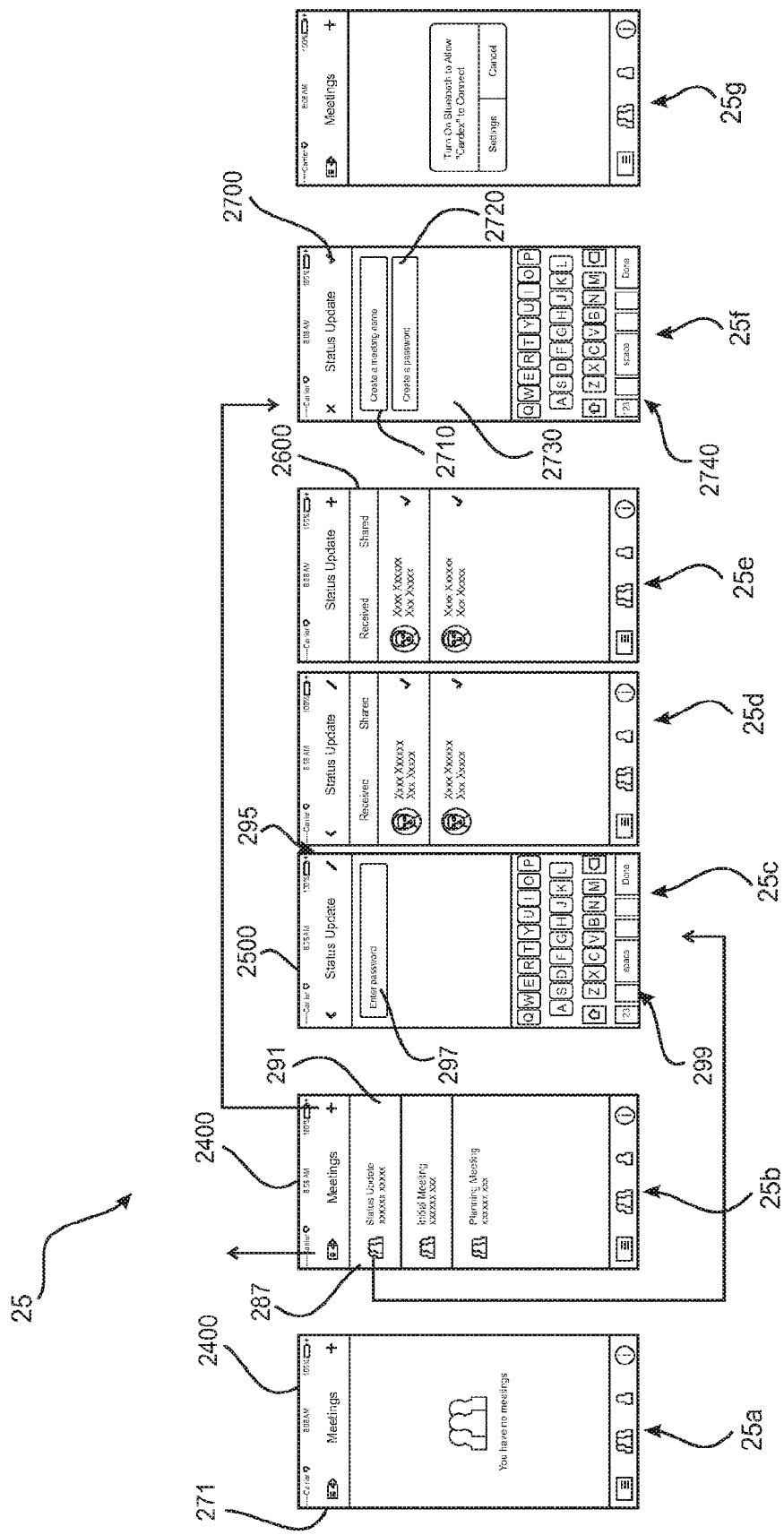

The MEETINGS functionality 25 is provided by way of the screens represented by the mockups in FIG. 2E. As in the BUSINESS CARDS functionality 24, common to all screens, with the exception of those associated with entering data, is the bottom toolbar 2020. A title bar is also provided, but this varies depending upon the functionality of the particular screen involved.

When invoked without any meetings being detected by the user device 120, the 'No Meetings' screen, as represented by the mockup NO MEETINGS 25a, is displayed, which provides a blank list of meetings. On the other hand, if meetings in the vicinity of the user device 120 that are able to be detected have been created and/or are in progress, the 'Meetings List' screen, as represented by the MEETINGS LIST mockup 25b, is displayed, whereby simple meeting information (SMI) is listed for each meeting detected. The protocol performed by the user device 120 to ascertain the detection of a meeting in the vicinity of the user device will be described in more specific detail later.

Both of the No Meetings' and 'Meetings List' screens include a title bar 2400 that includes a 'Quick Share' icon 271, providing an internal link for invoking the QUICK SHAREfunctionality 26, which will be described in more detail later, the 'meetings' title and a progressive disclosure control + for creating a meeting.

In the case where the 'Meetings List' screen 25b is displayed, the SMI comprises the name of a meeting in bold and the name of the creator or host of the meeting, unbolded, below the name of the meeting. As represented in the MEETINGS LIST mockup 25b, these are presented as discrete entries in a list, where each entry includes a meeting icon 287 on the left-hand side and an expansion indicator icon 291 on the right-hand side.

The App is coded so that if a user wants to join a particular meeting, then the user would simply tap the entry of the meeting, whereupon the 'Meeting List' screen 25b transitions to the 'View Meeting' screen as represented by the VIEW MEETING mockup 25c. For example, as shown in FIG. 2E, the meeting entry entitled 'Status Update' becomes the indexed meeting for joining and is tapped. The 'View Meeting' screen transitioned to shows a new title bar 2500 changing the title to the name of the meeting, in the present example being 'Status Update', and the progressive disclosure control to an edit symbol 295. The screen also provides for an 'Enter password' field 297 and a haptic keyboard 299, as represented in the VIEW MEETING mockup 25c. Thus the user is invited to enter a password in the 'Enter password' field 297. This is a password which is shared verbally, being typically orally or visually when face-to-face with the other meeting participants as a means of confirming the exchange of contact information between the user and the meeting participants.

Once a correct passcode is authenticated, then further functionality of the App is invoked, with the user device 120 of the user transitioning to a 'cards received and shared' screen as represented by the CARDS RECEIVED mockup 25*d* and the CARDS SHARED mockup 25*e*. The 'cards received and shared' screen includes a tab bar 2600 represented in both mockups having a Received tab and a Shared tab. The Received tab lists entries of the meeting participants containing SCI of each participant and the status of the contact information of the participant received by the user. The Shared tab lists entries of the meeting participants, again containing SCI information of each participant and the status of the sharing of the user's contact information with each participant. In each case, a tick icon signifies that the contact information of the identified participant has been received in the case of the 'Cards Received' screen 25*d*; and that the contact information of the user has been shared with the identified participant in the case of the 'Cards Shared' screen 25*e*.

In the case where a meeting is to be created by the user, the App is coded so that the progressive disclosure control + in the title bar 2400 of the 'Meetings List' screen 25*b* when tapped, invokes a transition to a 'Create Meeting' screen as represented by the CREATE MEETING mockup 25*f*. The 'Create Meeting' screen 25*f* includes a new title bar 2700 as represented in the CREATE MEETING mockup 25*f*, titled 'Create Meeting' and has a progressive disclosure control X on the left-hand side and a progressive disclosure control— on the right-hand side. The screen also includes a 'create a meeting name' field 2710; a 'create a password' field 2720; an optional comment area 2730; and a haptic keyboard 2740.

The control X allows an entry into an active field or the comment area to be deleted and the control—accepts the entry. The comment area can be used to enter the place and/or date of the meeting, which may be stored if the App includes additional functionality for retention of such data either on the user device 120 or in a remote database held on the server network 110. Once all the data for the created meeting is entered, the App is coded to store the created meeting as an active meeting on the user device 120 of the user in response to the user tapping a Done button 2750. This newly created meeting is then able to be interrogated by other user devices 120 of other App users, in a manner that will be described in more detail later.

The additional functionality of alerting the user to turn-on the networking protocol when it is switched off, when the MEETINGS functionality 25 is invoked is also provided by way of the alert screen, as previously described, as represented by the BLUETOOTH CONNECTION mockup 25*g*.

QUICK SHARE

The QUICK SHARE functionality 26, as previously described, is invoked by tapping the 'Quick Share' icon 271 in either the BUSINESS CARDS 24 or MEETINGS 25 functionalities. The QUICK SHARE functionality 26 provides a facility for a user to share contact information with the user device 120 of another person using the App, when they are in close proximity to each other.

The App is coded to transition the displayed screen from where the 'Quick Share' icon 271 is tapped to the 'Quick Share' screen as represented by the LIST mockup 26*a*, as shown in FIG. 2F. The 'Quick Share' screen 26*a* includes a title bar 2800, titled 'Quick Share' and a list of the parties, excluding the user, participating in the QUICK SHARE functionality 26 sharing or exchange of contact information.

In the example shown in FIG. 2F, the SCI of the first object detected nearby appears first, in this case 'Peter Cusack', and the SCI of the second object detected nearby, appears second, in this case 'Linda Griffith'.

As with the previous BUSINESS CARDS 24 and MEETINGS 25 functionalities, the additional functionality of alerting the user to turn-on the networking protocol when it is switched off is provided by way of the alert screen once more, as represented by the BLUETOOTH CONNECTION mockup 26*b*.

The App is coded so that the QUICK SHARE functionality 26 includes a status icon 2810 on the right-hand side of each participant entry, which is represented on the SHARED mockup 26*c*. The status icon 2810 has three states namely a single 'greyed' tick ✓, a double 'greyed' tick ✓✓, and a double 'coloured' tick ✓✓.

In the case of each participant, the display of a single 'greyed' tick indicates that the user's user device 120 has sent the user's contact information to be shared to the user device 120 of the particular participant displayed; the display of a double 'greyed' tick indicates that the user device 120 of the particular participant displayed has received the user's contact information to be shared; and the display of the double 'coloured' tick indicates that the particular participant has accepted the user's contact information to be shared.

The various functionalities of the App are implemented using a coded program that makes use of a set of API's that form part of the operating system. These API's are known as Google Nearby™, which are present via Google Play Services on any Android device, and can be adapted to run on an Apple device running iOS. The App also makes use of the networking protocol WebSocket, which comes as part of the Internet browser associated with the user device 120, to access a WebSocket server via the Internet.

The interaction between three user devices 120 operating the App and identified as User A, User B and User C, which invoke the MEETINGS functionality 25 to swap respective contact information between them, where the user device 120 of each make use of the Google Nearby APIs and the WebSocket protocol to access a remote WebSocket server, is set out in Table A below.

TABLE A

| User A | User B | User C |
|---|---|---|
| Launches App application | | |
| Initialised Google Nearby | | |
| (Used for Bluetooth discovery of other devices) | | |
| Initialises WebSocket to access WebSocket server | | |

TABLE A-continued

| User A | User B | User C |
|---|---|---|
| | Launches App application Initialised Google Nearby | |
| Google Nearby: User B has been discovered | Google Nearby: User A has been discovered | |
| Send message to WebSocket: Create Meeting | | |
| Receive message from WebSocket: Created Meeting with ID: 123 | | |
| Google Nearby: Update Discovery information to include meeting ID | Google Nearby: User A has updated discovery information with meeting ID 123 | |
| Send message to WebSocket: Join Meeting with ID: 123 | | |
| | Send message to WebSocket: Join Meeting with ID: 123 | |
| Send message to WebSocket: UserAContactInfo Object | Send message to WebSocket: UserBContactInfo Object | |
| Receive message from WebSocket: User B has joined meeting 123 | Receive message from WebSocket: User A has joined meeting 123 | |
| Send message to WebSocket: User B has sent his UserBContactInfo object | Send message to WebSocket: User A has sent his UserAContactInfo object | |
| | | Launches App application Initialises Google Nearby |
| Google Nearby: User C has been discovered | Google Nearby: User C has been discovered | |
| | | Google Nearby: User A has been discovered with Discovery Information containing meeting ID 123 |
| | | Google Nearby: User B has been discovered |
| | | Send message to WebSocket: Join meeting with ID: 123 |
| Receive Message from WebSocket: User C has joined meeting 123 | Receive Message from WebSocket: User C has joined meeting 123 | Receive message from Websocket: User A, B are participants in meeting 123 |
| | | Receive message from WebSocket: User A has sent his UserAContactInfo object |
| | | Receive message from WebSocket: User B has sent his UserBContactInfo object |
| | | Send message to WebSocket: UserCContactInfo object |
| Receive message from WebSocket: User C has sent his UserCContactInfo object | Receive message from WebSocket: User C has sent his UserCContactInfo object | |
| | Send message to WebSocket: Leave Meeting | |
| Receive message from WebSocket: User B has left meeting | | Receive message from WebSocket: User B has left meeting |
| Send message to WebSocket: Leave Meeting | | |
| | | Receive message from WebSocket: |

TABLE A-continued

| User A | User B | User C |
|--------|--------|--------|
| | | User A has left meeting
Send message to
WebSocket: Leave
Meeting
WebSocket meeting is ended |

The operation of the App code for the MEETINGS functionality 25 is more particularly described using pseudo code as follows.
Initialisation
  Google Nearby
    When the App has launched, Google Nearby is initialised.
  Once Google Nearby has been initialised, the user enables their device to be discovered by calling the Google Nearby method:
[GNSMessageManager publicationWithMessage: [GNSMessage messageWithContent:discoveryInfo]];
  Discoveryinfo is an NSDictionary with data:

```
{
    "uid":user_device_id
}
```

The device also needs to call a method to begin to listen for any other devices that have published their own discovery information. The message to begin listening is:
[GNSMessageManager subscriptionWithMessageFoundHandler:messageFoundHandler messageLostHandler:messageLostHandler]
  messageFoundHandler and messageLostHandler will be used to handle the event of a device coming into range and going out of range
  This is the end of the initialisation of Google Nearby
  WebSocket
    When the App has launched, the WebSocket protocol is used to initialise access to the system Winsocket server
    When the WebSocket server has been initialised, the socket between the particular user device 120 of the user and the system WebSocket server 110 is opened up using the url for the WebSocket server
    Once the WebSocket has opened successfully, a delegate method is called:
      (void)webSocketDidOpen:(SRWebSocket*)webSocket
    This delegate method lets the system know that connecting and opening the WebSocket was successful without any errors
    Once the WebSocket opens, the device sends a subscription message to the socket:

```
{
    "command":"subscribe",
    "Identifier":{
        "channel:"Meetingchannel"
    }
}
```

This message is telling the socket that this device wants to subscribe to the 'MeetingChannel'. All devices that have the App open will always need to be subscribed to the 'MeetingChannel'
The socket will response with the following message to confirm that the device has successfully subscribed to the 'MeetingChannel':

```
{
    "identifier":{
        "channel":"Meetingchannel"
    },
    "type":"confirm_subscription"
}
```

Now that the device has received a confirmation, the device must now identify itself so the WebSocket knows who the user is. The message that the device sends is:

```
{
    "command":"message",
        "data": {
            "device_uuid":user_device_id,
            "name":user_name,
            "action":"identify_user"
        },
        "identifier": {
            "channel":"MeetingChannel"
        }
}
```

The socket sends a message back to the device to confirm that the identification was successful:

```
{
    "identifier":{
        "channel":"Meetingchannel"
    },
    "message":"Welcome:
        C8ED356EC81849E5B56E0DCC64CD2AEE,UserName"
}
```

This is the end of the initialisation of the system Web Socket for a user.
Create Meeting
  The first step to setup a meeting is to request a unique meeting Id from the WebSocket
  The message to request a unique meeting id is:

```
{
    "command":"message",
    "Identifier":{
        "channel":"MeetingChannel"
    },
    "data":{
        "action":"create_meeting"
    }
}
```

The socket will respond with a unique meeting id:

```
{
    "Identifier":{
        "channel":"MeetingChannel"
    },
```

```
    "meetingId" = unique_meeting_id
}
```

Once the device has received the meeting id, it must then make the meeting id discoverable through Google Nearby so other users within the discoverable range can see what the meeting id is:

To update the discoveryInfo the following method is called:

[GNSMessageManager publicationWithMessage: [GNSMessage messageWithContent:discoveryInfo]];

DiscoveryInfo will contain the following data:

```
{
    "uid":user_unique_id,
    "meetingId:meeting_unique_id
}
```

Join Meeting

Once a user updates their Google Nearby Discovery info, all other users that have already discovered that user will receive a call back to their messageFoundHandler that was initialised in the first step The messageFoundHandler will return the user that has updated their discoveryInfo with the unique meeting id To join the existing meeting, you need to send a message to join the meeting to the WebSocket

```
{
    "command":"message",
    "Identifier":{
        "channel":"MeetingChannel"
    },
    "data":{
        "action":"join_meeting",
        "meeting_uuid":meeting_unique_id
    }
}
```

If the user joins the meeting successfully, their user device 120 will receive the following socket message to let them know who is currently in the meeting.

```
{
    "command":"participant_list',
    "data":{
        [{
            "name":"User1",
            "device_uuid":user1_unique_id
        },{
            "name":"User2",
            "device_uuid":user2_unique_id
        }]
    }
}
```

The user has now successfully joined a meeting

Once in a meeting, any member of the meeting can join and leave the meeting at anytime so the socket will send the other users participating in the meeting messages to notify the user devices of these users of any members that are joining or leaving the meeting.

A participant user device will receive the following message if a person has joined the meeting:

```
{
    "command":"participant_joined",
    "data":{
        "device_uuid":user_unique_id,
        "Name":user_name
    }
}
```

A participant user device will receive the following message if a person has left the meeting:

```
{
    "command":"participant_left",
    "data":{
        "device_uuid":user_unique_id,
        "Name":user_name
    }
}
```

Send User Contact Information

Once in a meeting, a user now has the ability to send their contact information to the other members in the meeting.

To do this, their user device will send the following message to the WebSocket

```
{
    "command":"message",
    "Data":{
        "action":"send_cardex",
        "meeting_uuid":meeting_unique_id,
        "ContactInfo_data":{
            "name":user_name,
            "companyName":user_company_name,
            "companyPosition":user_company_position,
            "mobileNumber":user_mobile_number,
            "emailAddress":user_email_address,
            "businessCardImage":user_business_card_image
            "userProfilePicture":user_profile_picture,
            "companyAddress":user_company_address,
            "companyWebsite":user_company_website,
            "phoneNumber":user_phone_number,
            "faxNumber":user_fax_number,
            "facebookPageUrl":user_facebook_page_url,
            "instagramPageUrl":user_instagram_page_url,
            "twitterName":user_twitter_name,
            "linkedInName":user_linkekin_name
        }
    },
    "Identifier":{
        "channel":"MeetingChannel"
    }
}
```

Receive Contact Info

Once in a meeting, a user now has the ability to receive contact information from another member of the meeting.

The user device of the user will receive the following message when the user device of another member of the meeting has sent their contact information

```
{
    "command":"send_cardex",
    "data":{
        "device_uuid":user_device_uuid,
        "ContactInfo_data":{
            "name":user_name,
            "companyName":user_company_name,
```

23
-continued

```
        "companyPosition":user_company_position,
        "mobileNumber":user_mobile_number,
        "emailAddress":user_email_address,
        "businessCardImage":user_business_card_image,
        "userProfilePicture":user_profile_picture,
        "companyAddress":user_company_address,
        "companyWebsite":user_company_website,
        "phoneNumber":user_phone_number,
        "faxNumber":user_fax_number,
        "facebookPageUrl":user_facebook_page_url,
        "instagramPageUrl:user_instagram_page_url,
        "twitterName"user_twitter_name
        "linkedInName":user_linkekin_name
    }
}
```

Leave Meeting

Once the user leaves the meeting, the following message is sent to the Web Socket

24

```
{
    "command":"message",
    "Identifier":{
        "channel":"MeetingChannel"
    },
    "data":{
        "action":"leave_meeting",
        "meeting_uuid":meeting_unique_id
    }
}
```

The interaction between two user devices 120 operating the App identified as User A and User B and invoking the QUICK SHARE functionality 26, similarly making use of the Google Nearby APIs and WebSocket protocol to access the remote system WebSocket server, is set out in Table B below.

TABLE B

| User A | User B |
|---|---|
| Launches App application | |
| Initialised Google Nearby (Used for Bluetooth discovery of other devices) | |
| Initialises Websocket | |
| | Launches App application |
| | Initialised Google Nearby |
| | Initialises Websocket |
| Google Nearby: User B has been discovered | Google Nearby: User A has been discovered |
| Send message to socket: | Receive message from socket: |
| Quick share request to User B with UserAContactInfo object | Quick share request received from User A |
| | Prompt displayed to 'Accept' or 'Reject' Quick share request |
| | If user presses 'Accept' |
| | Send message to socket: |
| | Quick share accept with UserBContactInfo Object |
| | Save User A UserAContactInfo object |
| Receive message from socket: | |
| Quick share request accepted from User B Save User B UserBContactInfo object | |
| | If user presses 'Reject' |
| | Send message to socket: Quick share rejected |
| Receive message from socket: | |
| Quick share request rejected from User B | |

The operation of the App code for the QUICK SHARE functionality 26 is more particularly described using pseudo code as follows:

Quick Share

Once a device is discovered, the user device now has the ability to send a Quick Share request directly to that user device instead of creating a meeting.

To send a Quick Share request the following message is sent to the Web Socket:

```
{
    "command":"quick_share_cardex",
    "identifier":{
        "channel":"MeetingChannel"
    },
    "data":{
        "device_uuid":requested_user_device_uuid,
        "cardex_data":{
            "name":user_name,
            "companyName":user_company_name,
            "companyPosition":user_company_position,
            "mobileNumber":user_mobile_number,
            "emailAddress":user_email_address,
            "businessCardImage":user_business_card_image,
            "userProfilePicture":user_profile_picture,
            "companyAddress":user_company_address,
            "companyWebsite":user_company_website,
            "phoneNumber":user_phone_number,
            "faxNumber":user_fax_number,
            "facebookPageUrl":user_facebook_page_url,
            "instagramPageUrl":user_instagram_page_url,
            "twitterName":user_twitter_name,
            "likedInName":user_linkekin_name
        }
    }
}
```

This socket message gets sent through the socket directly to the user with the user device uuid that is set in the user device uuid value The device that received the Quick Share request will receive a prompt notifying them that a user has requested to share contact information with them.

The prompt says:

```
'{User} would like to swap cards'
[Accept] [Reject]
```

Accept Quick Share

If the user accepts the Quick Share request, they will send the following message to the socket

```
{
    "command":"quick_share_cardex",
    "identifier":{
        "channel":"MeetingChannel"
    },
    "data":{
        "device_uuid":requesting_user_device_uuid,
        "ContactInfo_data":{
            "name":user_name,
            "companyName":user_company_name,
            "companyPosition":user_company_position,
            "mobileNumber":user_mobile_number,
            "emailAddress":user_email_address,
            "businessCardImage":user_business_card_image,
            "userProfilePicture":user_profile_picture,
            "companyAddress":user_company_address,
            "companyWebsite":user_company_website,
            "phoneNumber":user_phone_number,
            "faxNumber":user_fax_number,
            "facebookPageUrl":user_facebook_page_url,
            "instagramPageUrl":user_instagram_page_url,
            "twitterName":user_twitter_name,
            "linkedInName":user_linkekin_name
        }
    }
}
```

This socket message gets sent through the socket directly to the user that originally made the Quick Share request.

Reject Quick Share

If the user rejects the Quick Share request, they will send the following message to the socket

```
{
    "command":"reject_quick_share",
    "identifier":{
        "channel":"MeetingChannel"
    },
    "data":{
        "device_uuid":requesting_user_device_uuid,
    }
}
```

This socket message gets sent through the socket directly to the user that originally made the Quick Share request.

Now describing the box 130 functionality in more detail, the box is a beacon-compatible hardware transmitter that emulates the function of a user device 120 operating the App, but instead of representing a personalised user object, the box represents an inanimate user object, such as a business, service provider, retailer or networking event, such as a conference, seminar, or business meeting. Using the box 130, the user represented by the box is able to share contact information of similar type to a personalised user, providing details of the business, organisation or event with the user device 120 of a personalised user from an in situ location, rather than from a mobile location.

In this manner, users of a user device 120 running the App coming into the proximity of a box 130 will be engaged in a similar manner as they would by another user device 120 of another user. The box 130 in such an instance would have the same interactive functionality, i.e. the MEETINGS 25 and QUICK SHARE 26 functionality, as would a user device 120 operating the App, albeit this functionality being modified to accommodate an inanimate object using a beacon protocol instead of the customised protocol designed for personalised App functionality.

By using the box 130 and beacon protocol and/or the BUSINESS CARDS, MEETINGS and QUICK SHARE functionalities described, digital marketing opportunities in the form of content marketing can be promulgated by the contact information exchanging system creating a ready-made and actively growing database of users with contact information. This database can be used in a controlled manner to springboard the selective dissemination of content in the form of discount coupons, promotional and sales content provided by a COUPON functionality described in other embodiments of the invention.

One such application involving expanded box and beacon functionality together with COUPON functionality is described in a second embodiment of the present invention.

Figure 3A:
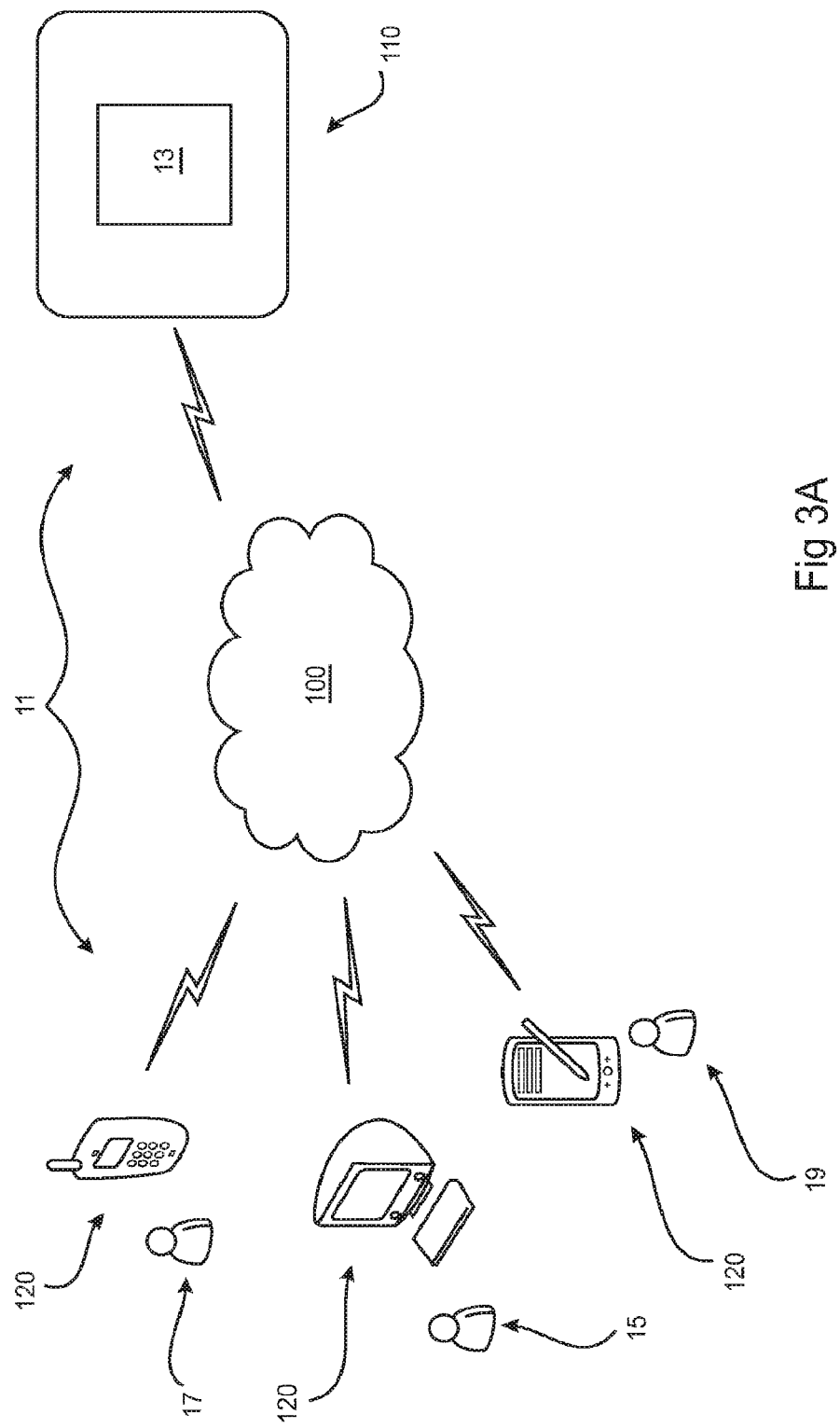

The second embodiment is substantially similar to the first embodiment, but involves a number of modifications to the client-server architecture as shown in FIG. 3A and illustrated more particularly in FIGS. 3B to 3E, and also the software design of the App as shown in FIG. 4, server interaction with the box 130 and beacon protocol, and also client interaction with the server, all of which are described in detail below.

Dealing firstly with the client-server architecture shown in FIG. 3A, the contact information and exchanging system 11 includes a server-based content management system (CMS) 13, which includes a website that contains all content that exists for the system. It is specifically designed to be displayed with a user-friendly interface that is easy to navigate and access by a user device 120 and a box 130 using an application program interface (API) for the operating system of the user device, e.g. iOS™ or Android™, to request data for the App from the CMS 13.

The CMS 13 accommodates three types of users, namely an administrator entity 15 being a person who has administrator rights to the CMS, a client service provider entity 17 being a person who has limited rights to the CMS and an ordinary user entity 19 being a person who has no rights to the CMS, but who can make use of the CMS. it also deals with four other entities, namely beacons 31 as previously mentioned, coupons 33 arising from use of the COUPON functionality, categories 35, which act as a filter for identifying different classes or types or kinds of good(s) or service(s) under which a coupon 33 may be categorised, and cards 37 denoting contact information of a user or entity that may be in the form for a business card or other record of information.

Figure 3B:
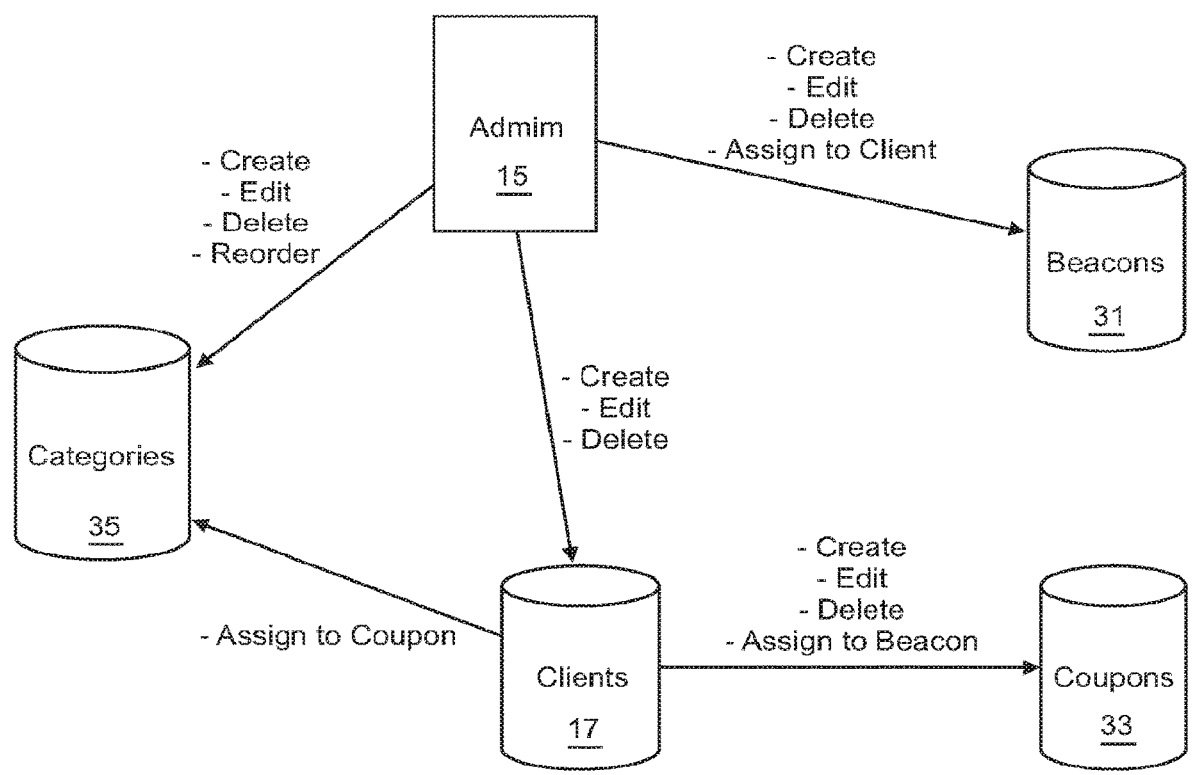

More particularly, as shown in FIG. 3B an administrator entity 15 has rights providing them with the ability to: create, edit, delete and assign to a client 17, beacons 31; create, edit and delete client entities 17; and create, edit, delete and reorder categories 35 and any sub-categories. A client entity 17 has limited rights providing them with the ability to: assign to a coupon, categories 35; and to create, edit, delete and assign to a beacon 31, coupons 33. A client entity 17 can also create a customised list of contact information, marketing information in the form of the coupon 33 and have the ability to assign these to a beacon created for them to operate from their box 130 for this purpose. Finally, an ordinary user entity 19 (not shown) can only login to the CMS website via their App and update their own data or request data that they have been given permission to request in the CMS 13 using the API.

In order to streamline the existing functionality of the contact information and exchanging system 11 and also accommodate the expanded box and beacon functionality, the display images and existing functionalities of the App run on the user device 120 have been modified relative to the first embodiment to provide for use of the COUPON functionality 41 and make available content marketing and notification facilities for the benefit of both users and clients.

Figure 4A:
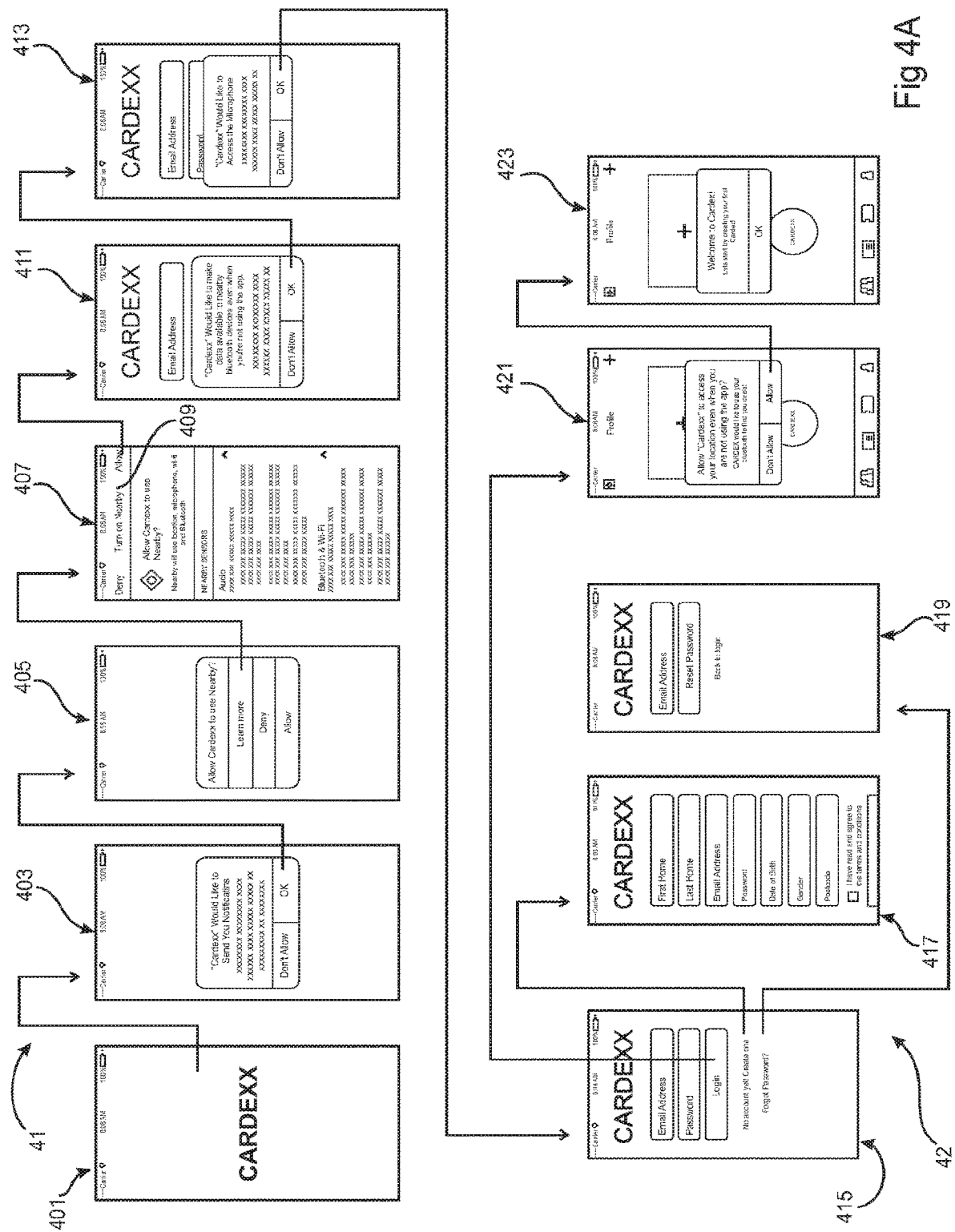

As shown in FIG. 4A, the START functionality 41 of the App has been expanded for the user to enter into a splash launch screen 401 upon tapping on the APP ICON 201 and transitioning to an initial notification request screen 403. The screen requests the user as to whether they wish to receive notifications by asserting either the 'Don't Allow' or 'OK' buttons as indicated, which allows the App to initialise the user device 120 for not only allowing sharing of business card information, but also for receiving notifications using the box and beacon coupon functionality which will be described in more detail later.

Upon the user asserting to allow notifications, the App is coded to display a location activation request screen 405 that request the user to allow or deny activation of the 'Nearby' location facility of the user device 120 by asserting the 'Deny' or 'Allow' buttons respectively or to learn more about the facility by asserting the 'Learn more' button. Asserting the 'Learn more' button progresses the App to display the 'Turn on Nearby' information screen 407, which provides some technical information concerning the operation of the Audio and Bluetooth & Wi-Fi facilities and devices of the user for communication purposes using the contact information and exchanging system 11. This information screen 407 incorporates Deny and Allow activation areas in the title bar 409 to facilitate further progression of the App, depending upon which area is activated by the user.

Asserting the Allow area causes the App to display a further notification request screen 411 requesting the user to indicate whether they would like to make data such as contact information available for sharing to nearby Bluetooth devices when the App is not being actively used and to use the Bluetooth communication facility for this purpose. Accordingly 'Don't Allow' and 'OK' buttons are respectively provided for asserting by the user to progress the App accordingly.

Asserting the 'OK' button causes the App to display another notification request screen 413 requesting the user to allow microphone use for the purposes of system communication. Again, 'Don't Allow' and 'OK' buttons are respectively provided for this purpose.

After completing the notification requests by the user asserting a response to the request screen 413, the App progresses to displaying the main 'Log in' screen 415. The Log in screen 415 allows the user to login and invoke the PROFILE functionality 42 to allow the user to edit their profile, or if they have not previously set up an account, to allow creation of same or reset the password for the user account if forgotten. As in the first embodiment, the PROFILE functionality 42 can be invoked directly by a user asserting the PROFILE functionality icon 4010 in a bottom toolbar 4200.

In the event of the user not having an account set up, the App provides for an activation area entitled 'No account yet? Create one' to be asserted and transition to a CREATE PROFILE screen 417, similar to the CREATE PROFILE screen of the previous embodiment. The CREATE PROFILE screen 417 provides facility for entering appropriate user data and facility for affirming that the terms and conditions have been read, as well is providing facility to read the same, in contrast to providing the ABOUT functionality as per the previous embodiment.

In the event of the user forgetting their password, the App provides for an activation area entitled 'Forgot Password?' To be asserted and transition to a 'reset password' screen 419. The 'reset password' screen 419 is of conventional design allowing for the email address of the user provided in the original account profile to be entered in an 'Email Address' field and a 'Reset Password' button to be asserted for the purposes of sending an email to the user providing the password or a temporary password for accessing the account. An activation area entitled 'Back to login' for invoking the App to just returning to the main Log in screen 417 is also provided.

In the case of the user simply logging in, the main Log in screen 417 provides for the Email Address provided in the original account profile to be entered in a login 'Email Address' field, the user password to be entered in the 'Password' field and a 'Log in' button to be asserted which causes an initial notification request screen 421 for the PROFILE functionality 42 to be displayed.

The initial notification request screen 421 requests the user to assert whether they wish the system 11 to access their current location when the App is not in active use and use the Bluetooth communication facility to respond to coupon requests provided by the box and beacon functionality available to users of the system. Activation areas entitled 'Don't Allow' and 'Allow' are respectively provided for the user to assert and configure the system 11 accordingly, whereupon the App progresses to displaying a further notification screen 423 welcoming the user to create their first business card entry if they have not yet done so.

Once the initial notifications for the PROFILE functionality 42 are completed by asserting the further notification screen 423 appropriately, the App progresses to display the main profile screen 425 is shown in FIG. 4B. The main profile screen 425 is essentially the same as the corresponding screen in the first embodiment, and the App follows similar functionality for adding an image of the user using the camera of the user device 120 and adding a business card of the user for sharing purposes. To add an image of the user using the camera, and activation area entitled 'CARDEXX' can be asserted to cause the App to display the 'Edit Profile' screen 427. An image taken by the camera is displayed at an image screen 429 can be cancelled or chosen by asserting respective 'Cancel' or 'Choose' activation areas. This progresses the App to return to an updated main profile screen 431, in the present example, still showing the business card image to be added.

As shown in the main profile screen 425 there is provided an 'add business card' activation area 426 for asserting to add a business card of the user. The present embodiment takes advantage of the existing BUSINESS CARDS functionality 43 to add a business card image, as opposed to the feature being included as discrete PROFILE functionality in accordance with the first embodiment. The main profile screen 425 also includes a return icon 433 and a '+' icon activation area in the title bar 435 for respectively returning to the main Log in screen 415 of the system 11 and the 'edit profile' screen 427, respectively.

Figure 4C:
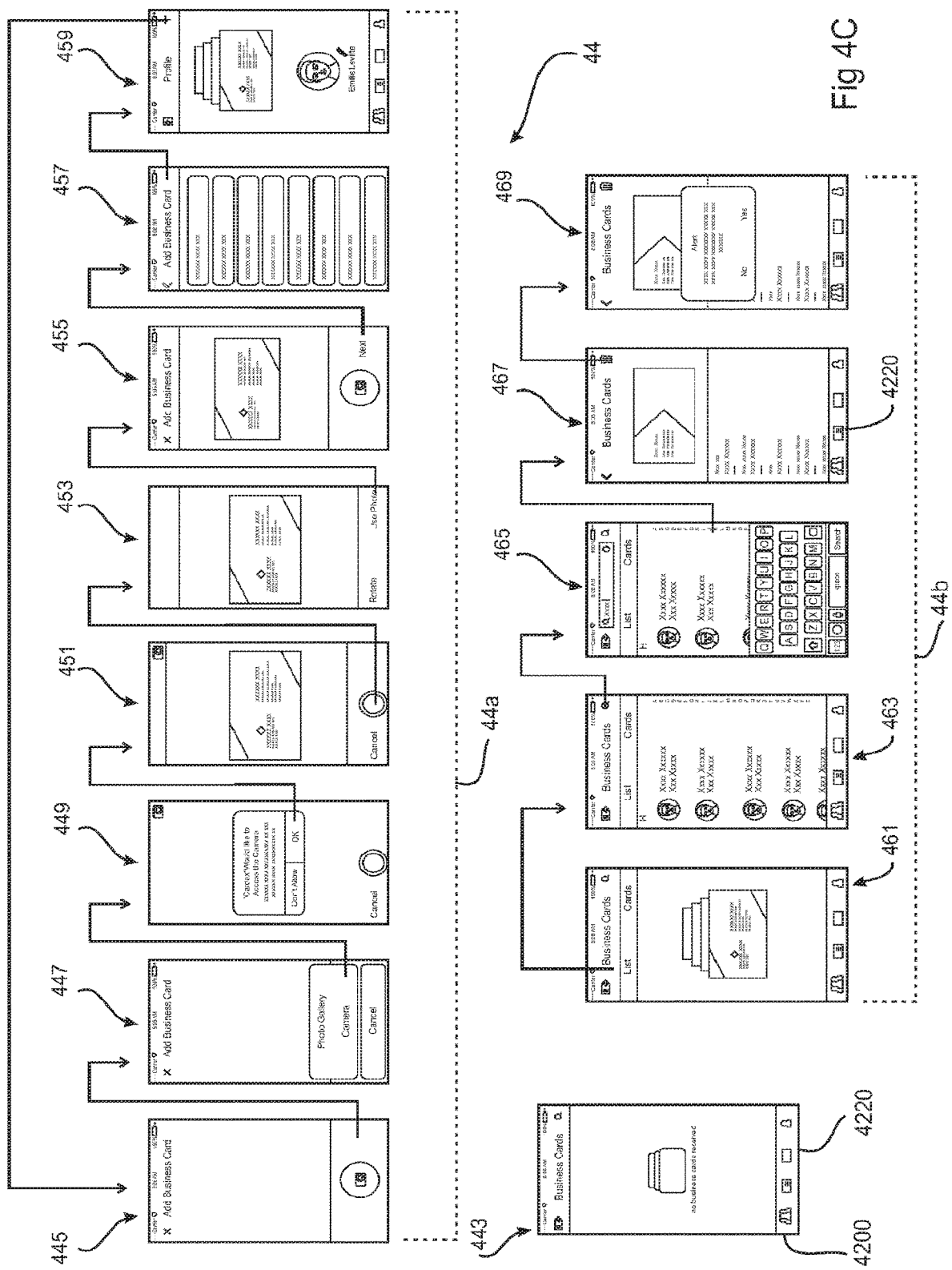

The BUSINESS CARDS functionality 44 as shown in FIG. 4C is substantially the same as the first embodiment, which when initially invoked by the App upon a user tapping the BUSINESS CARDS functionality icon 4220 in the bottom toolbar 4200, displays a 'No business cards received' screen 443. The App then progresses to display the Add Business Card screen 445, whereupon subsequent screens 447 to 459 as described in the first embodiment are subsequently invoked to progress through and complete an add business card functionality 44a. The subsequent screens include an image options screen 447 to allow an image to be selected from the existing photo gallery of the user device or alternatively a camera image to be taken, a camera access request screen 449, an image capture screen 451, and image accept or retake screen 453, an information progress screen 455 and edit business card screen 457 for entering discrete business card information, and finally a profile image screen 459 for displaying graphically a stack of stored business cards with the entered business card on top together with the user image.

The BUSINESS CARDS functionality 44 also includes facility for handling and displaying existing business cards in a similar manner to the first embodiment, where the Business Cards screens 461 and 463 providing the display cards and display list facility are invoked by asserting either the 'Cards' or 'List' activation areas respectively. Subsequent screens 465 to 469 are invoked and progress through to complete an existing business card functionality 44b, including a search list screen 465, a business card screen 467 for a selected list item and a delete item confirmation screen 469 arising from choosing the trash icon 471 for a displayed business card item.

Figure 4D:
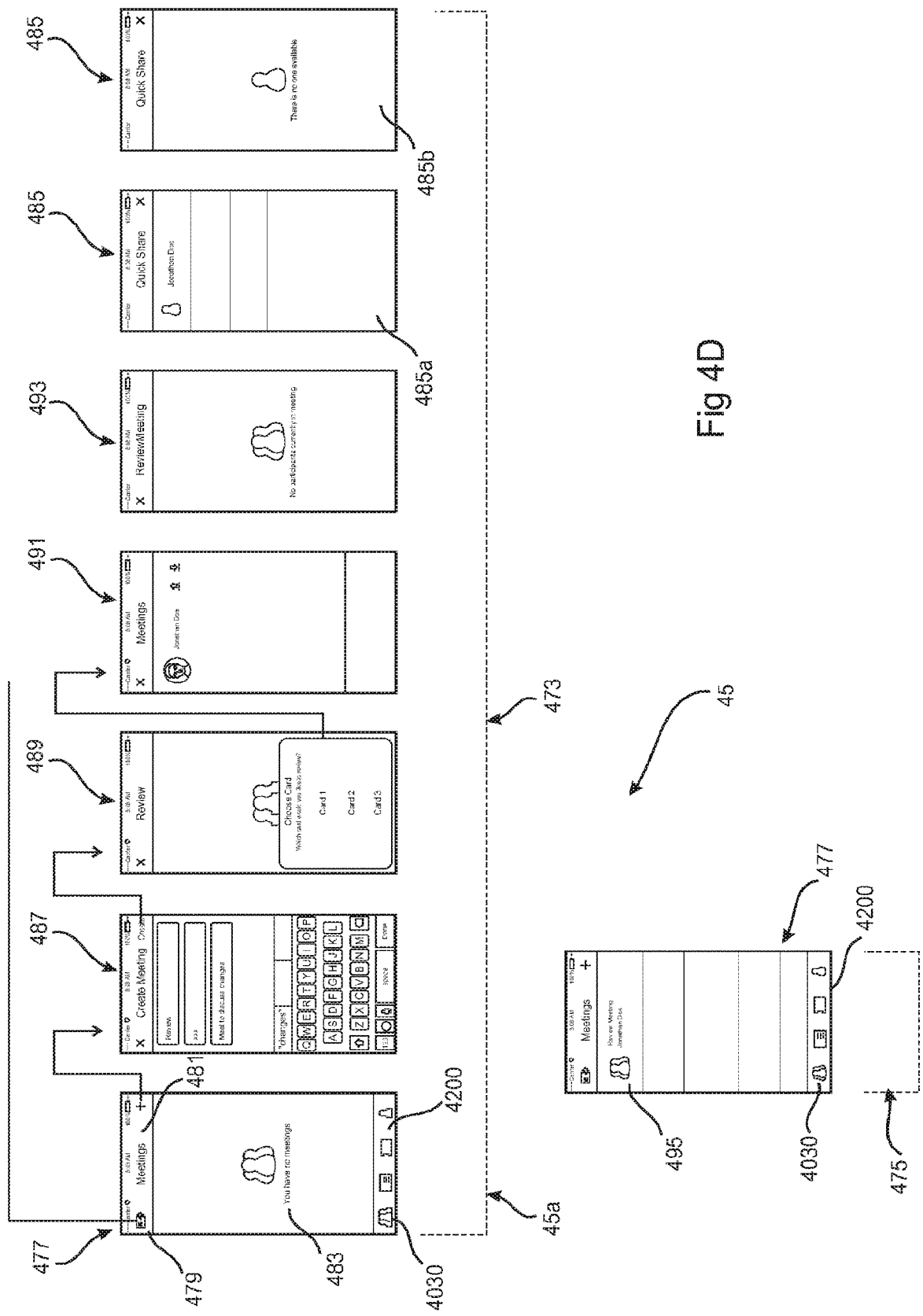

The MEETINGS functionality 45 as shown in FIG. 4D is invoked by asserting the meetings functionality icon 4030 in the bottom toolbar 4200 and is similar to that of the first embodiment, providing facility for adding a meeting 473 and displaying status of an existing meeting 475. In the case of wishing to add a meeting or display an existing meeting, meetings screen 477 is displayed by the App, which includes a 'Quick share' icon 479 and '+' icon in the title bar 481. Where no meetings are attended, the App displays a 'You have no meetings' graphic 483.

Instead of providing discrete QUICK SHARE functionality as in the first embodiment, the present embodiment incorporates the facility within the MEETINGS functionality by the user asserting the 'Quick share' icon 479 and the App transitioning to a 'Quick Share' screen 485. If there is a person nearby to share contact information with, then their status is displayed this a in the Quick share representation 485a. If no one is available to share contact information with, then the 'There is no one available' graphic 485b is displayed.

If the user wishes to create a meeting, then the '+' icon is asserted and a 'Create Meeting' screen 487 is displayed by the App to enable a meeting to be set up, in a similar manner as in the first embodiment. Subsequent screens 489 to 493 are invoked to complete the business card sharing facility 45a of the MEETINGS functionality. These include a card sharing selection screen 489, a review meeting card sharing status screen 491, showing upload and download status, and finally an updated review meeting screen 493 which displays when no participants are in the meeting to share information.

With respect to the existing meeting facility 475, the status 495 of all existing meetings in the vicinity of the user device 120 are displayed by way of the meetings screen 477.

COUPONS

The COUPON functionality 46 is shown in FIG. 4E and is invoked by asserting a Coupon icon 4050 in the bottom toolbar 4200. The App then invokes a coupon screen 501, which at the start when no coupons have been received, displays a 'No coupons received' graphic 503. A configuration icon 505 provides an activation area in the title bar 507 of the coupon screen 501, which when asserted causes the App to display a 'Select Categories' screen 509.

The Select Categories screen 509 allows the user to select one or more categories of prescribed merchandise or services in relation to which they are interested in receiving coupons. The particular category is simply asserted and a 'tick' is displayed to show the category items selected. Once the category items are selected, the user is able to save them by asserting a 'Save' activation area, which then invokes a coupon display screen 511 that prevents displaying a Cards view of stored coupons or a List view of stored coupons, in a similar manner to the BUSINESS CARDS functionality 43144, depending upon whether the 'Cards' or 'List' activation area is asserted. From the List view, an identified coupon can be selected and details of the same displayed in a selected coupon screen 513. Facility is provided for deleting the coupon by way of asserting a 'trash' icon 515 provided in the title bar 517 of the selected coupon screen 513. This causes the App to display a delete confirmation screen 519.

Essentially, the user uses the COUPON functionality 46 to configure their user device to receive and process a beacon identifier issued by the beacon 31 of a box 130 belonging to a client service provider 17 as described in more detail later, and permit the box to send one or more push notifications in the form of digital messages that may comprise a coupon 33 to provide promotional sales offers to facilitate marketing and advertising of a client service provider acquiring a box for this purpose.

FIG. 4F shows various sharing notifications 47 that may be displayed by the App depending upon the nature of the sharing performed. These can be the result of push notifications received by a user device 120 being appropriately configured and passing nearby a box 130, as shown in notification screens 601 and 603, or they can be the result of a QUICK SHARE facility or meeting as shown in notification screens 605, 607 and 609. As can be appreciated, other types of screen notifications may be provided to suit the circumstances.

Now returning to describing the operation of the CMS 13 in more detail the CMS is designed to provide different configuration options for administrator entity users, through a common user interface. As shown in FIG. 5, the user interface includes providing a navigation bar 701 identifying the different types of users and objects that an administrator is able to configure: Admins' for an administrator entity 15, 'Clients' for a client service provider entity 17, 'Beacons' for configuration of a beacon 31 associated with a box 130 of a client entity 17, 'Users' for ordinary user entities 19 and 'Categories' for defining category allocations available to user entities. As noted, facility is also provided for accessing account details via 'My details' and login and logout via 'Sign In/Out'.

As shown in FIG. 5A, when an administrator user 15 logs into the CMS 13, the user interface of the CMS is designed to provide the user with an administrator user interface display page 703 incorporating the navigation bar 701 at the top of the display with the 'Admins' area highlighted. As can be seen, facility is provided for adding an administrator and editing and/or deleting existing administrators registered with the system. It also includes any pending invitations.

The second option on the navigation bar 701 of the CMS 13 is 'Clients'. Once the login administrator 15 entity taps on the 'Clients' activation area a 'Clients' page 705 as shown in FIG. 5B is displayed by the CMS. On this page the administrator 15 can see all of the current clients 17 that have already been created. The administrator user entity 15 has the ability to view, edit and delete existing clients 17.

To create a new client 17, the administrator entity 15 can tap on an 'Add a client' activation area which is located at the top right of the 'Clients' page 705. This will display the 'Add a client' page 707 as shown at FIG. 5C.

All fields shown need to be filled out to create a client 17 from the screen as follows:

First Name: The first name of the representative for the client

Last Name: The last name of the representative for the client

Email Address: The email address for the representative for the client

Company Name: The company name of the client

Once the administrator user entity 15 presses on 'Create Client' the client 17 will exist within the CMS 13 and appear in the list of clients. An email will be sent to the client 17 using the email address that was entered to allow them to setup their account by creating a password. This will give them the ability to now login to the CMS 13 as a Client service provider 17 and view relevant sections of the CMS.

The third option in the navigation bar 701 is 'Beacons', which provides a beacons display page 709 as shown in FIG. 5D. On this screen all of the current beacons 31 that have already been created and the Client 17 they are assigned to are listed. The administrator user entity 15 has the ability to edit and delete beacons 31.

To create a new beacon 31, the administrator 15 can tap on an 'Add a beacon' activation area which is located at the top right of the beacon's display page 709. This will display the 'Add a beacon' page 711.

All fields need to be filled out to create a beacon 31 from the screen as follows:

Name: A name to identify the beacon

Serial Number: Every beacon has a unique serial number. This is unique so every beacon will have a different serial number Client: This is a drop down list of all Clients that already exist in the CMS. An admin will choose a client from the list to assign the beacon to.

Major: The major id is a number that exists on the beacon. This is assigned on the beacon and will need to be the correct id that is already identified on the beacon.

Minor: The minor id is a number that exists on the beacon. This is assigned on the beacon and will need to be the correct id that is already identified on the beacon.

The major and minor ids are set on the beacon 31 when they are first setup and are used to request the data from the API. Once all the fields are filled out, the administrator user 15 presses a 'Create Beacon' activation area and the new beacon 31 will then exist in the CMS 13.

Once a service provider client 17 is created, the CMS 13 is designed to send them an email from the system 11 to let them know that an account has been created for them. The system is designed to provide them with a link in the email so that they can click on the link to take them directly to the CMS 13 and allow them to create their own password. Once a password is created, the client service provider 17 is able to login using their email address and password. Once they are locked in, the user interface of the CMS 13 will provide them with their own customised screen having a navigation bar 713, providing them with their own 'Beacons', 'Cardex cards' and 'Coupons' activation areas.

In the case of the 'Beacons' activation area being asserted, the client Beacons page 715 is displayed as shown in FIG. 5E. This screen lists all of the beacons 31 that have been assigned to the client service provider 17 by the administrator user entity 15, where the client service provider has the ability to edit the indicated beacon via the 'Edit' button 717. Asserting this button causes the CMS 13 to display the particular beacon details in an Edit Beacon page 719, an example of which is shown in FIG. 5G. In this page, the specified fields are described as follows:

Name: The name of the beacon

Sent Cardex: This is a drop down list of all the cardexes that have been create for me to paint for a boat can give a share it d by the client They can select of the cardexes to be assigned to the beacon Push Message: This is the push notification message that the User will receive when they come into range of the beacon Save to Contacts: This is a checkbox that is used to let the iOS and android applications know whether to save the cardex to the devices contact list or not when they come into range of the beacon Receive Cardexes: This is a checkbox that is used to allow this client to receive cardex from the users when they come into range of the beacon. Setting it to no will not save the users cardex to the client. Setting it to yes will save a copy of the users cardex to the client The 'Cardex cards' activation area when activated causes the user interface of the CMS 13 to generate a Cardex cards page 718 as shown in FIG. 5H. This page contains all of the contact information entries that have been created by the client service provider 17. Once a contact information card is created here, it can be assigned to a beacon via the Edit Beacon page 719. The client service provider 17 also has the ability to edit and delete existing contacts they have created or create a new contact by using an 'Add Card' button 721.

The 'Coupons' activation area when asserted displays a Coupons page 723 as shown in FIG. 5I. This page contains all of the coupons 33 that have been created by the client service provider 17. The client service provider 17 has the ability to edit, delete or create new coupons 33 via this page. When a client service provider 17 presses the 'Add a coupon' button 725, they will be provided with an 'Add a coupon' screen 727 as shown in FIG. 5J. The various fields included in this screen are as follows:

Name: The name of the coupon
Description: The description for the coupon
Expires at: The expiration date of the coupon
Image: An image to be used as the visual representation of the coupon. The client will create the image using external software
Beacons: This will be a list of all beacons assigned to the client. Tapping on the checkbox will assign the coupon to that beacon
Categories: The categories that the coupon can assign to itself.

Once a coupon 33 is created, it will be assigned to the beacons it has been linked to via the beacon's checkbox.

Now having regard to an ordinary user 19, the CMS 13 is designed to enable an ordinary user to have the ability to update their categories 35 via the App upon asserting the coupon configuration settings activation area, as previously described. By invoking this facility, the user 19 can select which categories they are interested in and will get saved to the CMS 13 via the API. The Select Categories screen 509 that is displayed is part of the CMS.

Now describing the manner of operation in terms of ranging a beacon, when a user walks into the range of a beacon, their device will receive a notification to tell them that a beacon is nearby. Once the beacon is ranged the device will receive its major and minor id. This major and minor id will be used to make a request to the API to get the beacon details.

The beacon details will contain the following information:
Push notification message saved to the beacon by the client
Cardex assigned to the beacon
Coupons assigned to the beacon The device will check the coupons that are received to see if any of them contain a category that is selected by the user. If one or more do have a category that the user has selected the push notification will be displayed on the device to the user. If it doesn't have a valid category the push notification will not be displayed.

When the user taps on the push notification and opens the application, the application will make an API request to the server to assign the valid coupons to the user. Once that is done the coupons will appear in the coupon list for the user.

Now describing the particular interaction between three user devices 120 operating the App and identified as User A, User B and User C in accordance with the MEETINGS functionality of the present embodiment to swap respective contact information between them, where the user device 120 of each make use of the Google Nearby API and the WebSocket protocol to access a remote WebSocket server, regard is made to Table C below.

TABLE C

| User A | User B | User C |
|---|---|---|
| Launches Application Initialised Google Nearby (Used for bluetooth discovery of other devices) Initialises Websocket | | |
| | Launches Application Initialised Google Nearby | |
| Google Nearby: User B has been discovered Send mesage to socket: Create Meeting Receive message from socket: Created Meeting with ID: 123 | Google Nearby: User A has been discovered | |
| Google Nearby: Update Discovery information to include meeting ID | Google Nearby: User A has updated discovery information with meeting ID 123 | |
| Send message to socket: Join Meeting with ID: 123 | | |
| | Send message to socket: Join Meeting with ID: 123 | |
| Send message to socket: Cardex Object Receive message from socket: User B has joined meeting 123 Send message to socket: User B has sent his cardex object | Send message to socket: Cardex Object Receive message from socket: User A has joined meeting 123 Send message to socket: User A has sent his cardex object | |
| | | Launches Application Initialises Google Nearby |

TABLE C-continued

| User A | User B | User C |
|---|---|---|
| Google Nearby: User C has been discovered | Google Nearby: User C has been discovered | |
| | | Google Nearby: User A has been discovered with Discovery Information containing meeting ID 123 |
| | | Google Nearby: User B has been discovered |
| | | Send message to socket: Join meeting with ID: 123 |
| Receive Message from socket: User C has joined meeting 123 | Receive Message from socket: User C has joined meeting 123 | Receive message from socket: User A, B are participants in meeting 123 |
| | | Receive message from socket: User A has sent his cardex object |
| | | Receive message from socket: User B has sent his cardex object |
| | | Send message to socket: Cardex object |
| Receive message from socket: User C has sent his cardex object | Receive message from socket: User C has sent his cardex object | |
| | Send message to socket: Leave Meeting | |
| Receive message from from socket: User B has left meeting | | Receive message from from socket: User B has left meeting |
| Send message to socket: Leave Meeting | | |
| | | Receive message from from socket: User A has left meeting |
| | | Send message to socket: Leave Meeting |
| | | Websocket meeting is ended |

Figure 6A:
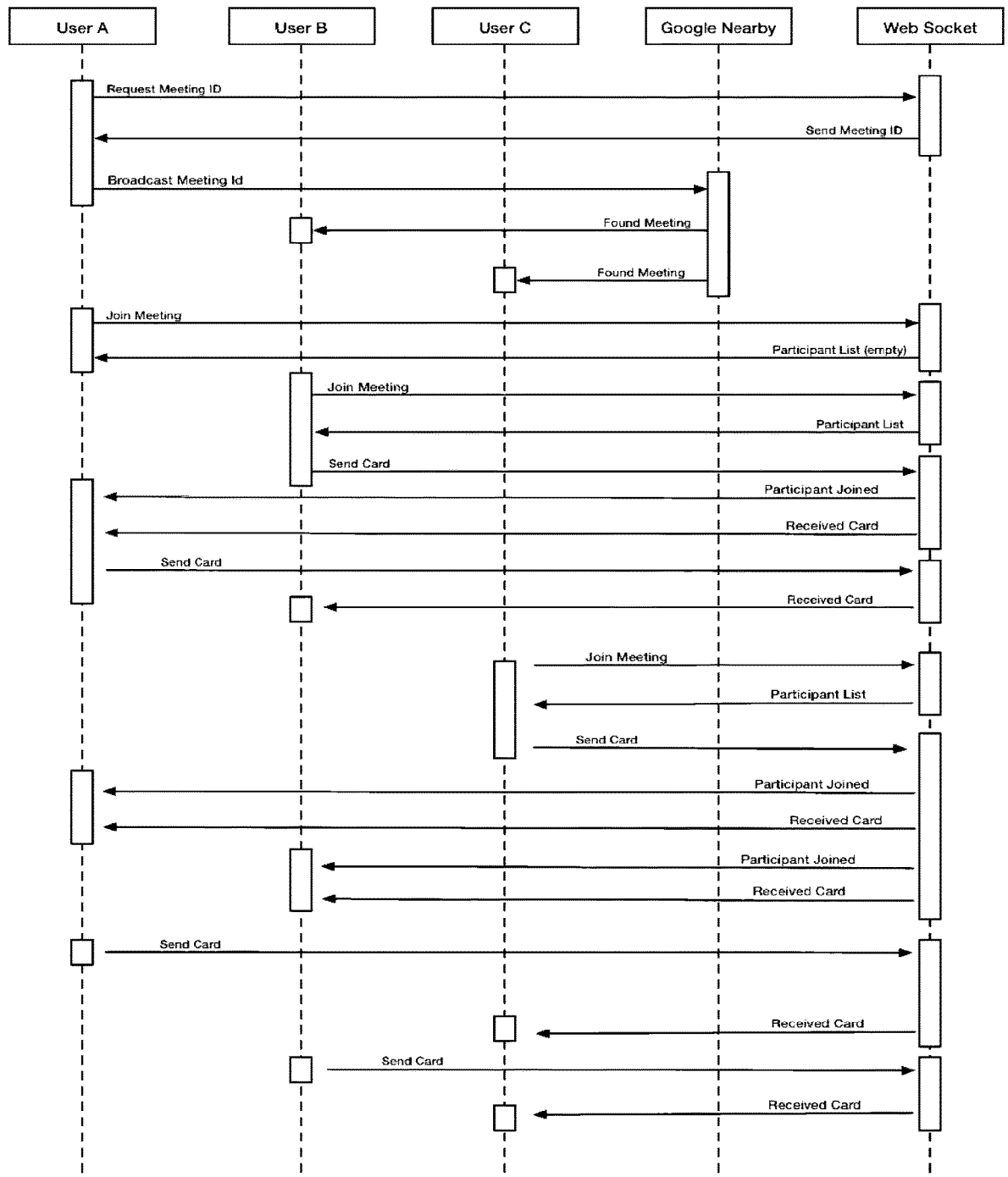

The sequence flow of the software for creating a meeting between three users, including how the subsequent users find the meeting, join it and share cards 37 with one another during a meeting as part of the MEETINGS functionality 45 is shown in the sequence diagram of FIG. 6A of the drawings.

The operation of the App code for the MEETINGS functionality in accordance with the second embodiment is more particularly described using pseudo code as follows.

Initialisation
  Registration
  When the app has launched, the device will do a check to see if a user is currently logged in, if not the app will display the login screen
  If the user has a login they can login to the app (Go To Login
  If not, they will have the option to create a new account.
  When a user fills in the registration form and presses 'Register' the following will be sent to the server
  POST http address for signup with the following data

```
{
  "email":us8rs_8mailaddress
  "password": use rs_password ,
  "first_nam e": users_first_name ,
  "last_name":users_last_name,
```

-continued

```
  "gend6r":users_gender,
  "postcode":users_postcode,
  "date_of_birth":users_date_of_birth
}
```

The API will return a success and allow the user to enter the app and provide them a unique authentication token Login
  If a user has previously registered they will be able to login to the app using their email address and password
  Once they enter their email address and password the following will be sent to the server:
  POST http address for login with the following data

```
{
  "email":users_emailaddress
  "passwo rd" : use rs_passwo rd ,
}
```

The API will return a success and allow the user to enter the app and provide them a unique authentication token If the user is logged in, the app will allow them to stay logged in between app launches by using their authentication token Forgot Password If a user has previously registered but have forgotten their password, they will be able to request a password reset by going to the forgot password screen and entering their email address Once they enter their email address, the following will be sent to the server:

POST http://cardex-2.herokuapp.com/api/v1/reset_password with the following data

```
{
    "email":users_emailaddress
}
```

The API will return a success and send an email to the user with how to reset their password.

Once they have reset their password they will be able to login via the login screen Google Nearby When the app has launches, Google Nearby is initialised.

Once Google Nearby has been initialised, the user enabled their device to be discovered by calling the Google Nearby method:

[GNSMessage anager publicationWith essage:[GNS essage messageWithContentidiscoveryInfo]];

Discoveryinfo is an NSDictionary with data

```
{
    "uid":user_device_id
}
```

The device also needs to call a method to begin to listen for any other devices that have published their own discoveryinfo. The message to begin listening is:

[GNSMessageManager subscriptionWithMessageFoundHandler: messageFoundHandler messageLostHandlenmessageLostHandler messageFoundHandler and messageLostHandler will be used to handle the event of a device coming into range and going out of range This is the end of the initialisation of Google Nearby WebSocket When the app has launched, the Cardex WebSocket is also initialised When the webSocket has been initialised, I open up the socket using the url for the Cardex Server Once the WebSocket has opened successfully, a delegate method is called (void)webSocketDidOpen:(SRWebSocket *)webSocket This delegate method lets me know that connecting and opening the web socket was successful without any errors Once the webSocket opens, the device sends a subscription message to the socket

```
{
    "command":"subscribe",
    "Identifier":{
        "channel:"MeetingChannel"
    }
}
```

This message is telling the socket that this device wants to subscribe to the 'MeetingChannel'. All devices that have Cardex app open will always need to be subscribed to the 'MeetingChannel'

The socket will response with the following message to confirm that the device has successfully subscribed to the 'MeetingChannel'

```
{
    "identifier":{
        "channel":"MeetingChannel"
    }
    "type":"confirm_subscription"
}
```

Now that the device has received a confirmation, the device must now identify itself so the webSocket knows who the user is. The message that the device sends is:

```
{
    "command":"message",
    "data": {
        "id":user_id,
        "authentication_token":user_authentication_token,
        "action":"identify_user"
    },
    "identifier": {
        "channel":"MeetingChannel"
    }
}
```

The socket sends a message back to the device to confirm that the identification was successful

```
{
    "identifier":{
        "channel":"MeetingChannel"
    },
    "message":"Welcome"
}
```

This is the end of the initialisation of the Cardex Web Socket

Create Meeting

The first step to setup a meeting is to request a unique meeting Id from the WebSocket The message to request a unique meeting id is:

```
{
    "command":"message",
    "Identifier":!
        "channel":"MeetingChannel"
    }.
    "data":{
        "action" :"create_meeting"
    }
}
```

The socket will respond with a unique meeting id:

```
{
    "Identifier":{
        "channel':"MeetingChannel"
    },
    "meetingId" = unique_meeting_id
}
```

Once the device has received the meeting id, it must then make the meeting id discoverable through Google Nearby so other users within the discoverable range can see what the meeting id is.

To update the DiscoveryInfo the following method is called:

[GNSMessageManager publicationWithMessage: [GNSMessage messageWithContent:discoveryInfo]];

DiscoveryInfo will contain the following data:

```
{
    "uid":user_unique_id,
    "meetingId:meeting_unique_id
}
```

Join Meeting

Once a user updates their Google Nearby Discovery info, all other users that have already discovered that user will receive a call back to their messageFoundHandler that was initialised in the first step The messageFoundHandler will return the user that has updated their discoveryInfo with the unique meeting id To join the existing meeting, you need to send a message to join the meeting to the Web Socket

```
{
    "command":"message",
    "Identifier":{
        "channel":"MeetingChannel"
    },
    "data":{
        "action":"join_meeting",
        "meeting_uuid":meeting_unique_id
    }
}
```

If the user joins the meeting successfully, they will receive the following socket message to let them know who is currently in the meeting.

```
{
    "command":"participant_list',
    "data":{
        [{
            "name":"User1 ",
            "device_uuid":user1_unique_id
        }.{
            "name":"User2",
            "device_uuid ":user2_unique_id
        }]
    }
}
```

The user has now successfully joined a meeting

Once in a meeting, any member of the meeting can join and leave the meeting at anytime so the socket will send you any messages to notify you of any members that are joining or leaving the meeting.

A participant user device will receive the following message if a person has joined the meeting:

```
{
    "comma nd":"participant_joined",
    "data":{
        "device_uuid":user_uniquejd,
        "Name":user_name
    }
}
```

A participant user device will receive the following message if a person has left the meeting:

```
{
    "command":"participant_left",
    "data":{
        "device_uuid":user_unique_id,
        "Name":user_name
    }}
```

Send User Contact Information

Once in a meeting, you now have the ability to send their contact information to the other members in the meeting.

To do this, their user device will send the following message to the WebSocket

```
{
    "command":"message",
    "Data":{
        "action" :"send_cardex",
        "meeting jjuid":meeting_unique_id,
        "cardex_data":{
            "name":user_name,
            "companyName":user_company_name,
            "companyPosition":user_company_position,
            "mobileNumber":user_mobile_number,
            "emailAddress":user_email_address,
            "businessCardImage":us9r_business_card_image,
            "userProfilePicture":user_profile_picture,
            "companyAddress":user_company_address,
            "companyWebsite":user_company_website,
            "phoneNumber":user_phone_number,
            "faxNumber":user_fax_number,
            "facebookPageUrl":user_facebook_page_url,
            "instagramPageUrl":user_instagram_page_url,
            "twitterName":user_twitter_name,
            "linkedInName":user_linkekin_name
        }
    },
    "Identifier":!
        "channel":"MeetingChannel"
}
```

Receive Contact Information

Once in a meeting, a user now have the ability to receive contact information from another member of the meeting.

The user device of the user will receive the following message when another member of the meeting has sent their contact information:

```
{
    "command":"'send_cardex",
    "data":{
        "device_uuid":user_device_uuid,
        "cardex_data":{
            "name":user_name,
            "companyName":user_company_name,
            "companyPosition":user_company_position,
            "mobileNumber":user_mobile_number,
            "emailAddress":user_email_address,
            "businessCardImage":user_business_card_image,
            "userProfilePicture":user_profile_picture,
            "companyAddress":user_company_address,
            "companyWebsite":user_company_website,
            "phoneNumber":user_phone_number,
            "faxNumber":user_fax_number,
            "facebookPageUrl":user_facebook_page_url,
            "instagramPageUrl":user_instagram_page_url,
            "twitterName":user_twitter_name,
            "linkedInName":user_linkekin_name
```

-continued

```
        }.
    }
```

Leave Meeting

Once the user leaves the meeting, the following message is sent to the WebSocket

```
{
    "command":"message",
    "Identifier":{
        "channel":"MeetingChannel"
    },
    "data":{
        "action":"leave_meeting",
        "meeting_uuid":meeting_unique_id
    }
}
```

The interaction between two user devices 120 operating the App identified as User A and User B and invoking the QUICK SHARE functionality, similarly making use of the Google Nearby APIs and WebSocket protocol to access the remote system WebSocket server, is set out in Table D below.

TABLE D

| User A | User B |
|---|---|
| Launches Application | |
| Initialised Google Nearby (Used for bluetooth discovery of other devices) | |
| Initialises Websocket | |
| | Launches Application |
| | Initialised Google Nearby |
| | Initialises Websocket |
| Google Nearby: User B has been discovered | Google Nearby: User A has been discovered |
| Send message to socket: | Receive message from socket: |
| Quick share request to User B with Cardex object | Quick share request received from User A |
| | Prompt displayed to 'Accept' or 'Reject' quick share request |
| | If user presses 'Accept' |
| | Send message to socket: |
| | Quick share accept with Cardex Object |
| | Save User A cardex object |
| Receive message from socket: | |
| Quick share request accepted from User B | |
| Save User B cardex object | |
| | If user presses 'Reject' |
| | Send message to socket: |
| | Quick share rejected |
| Receive message from socket: | |
| Quick share request rejected from User B | |

Figure 6B:
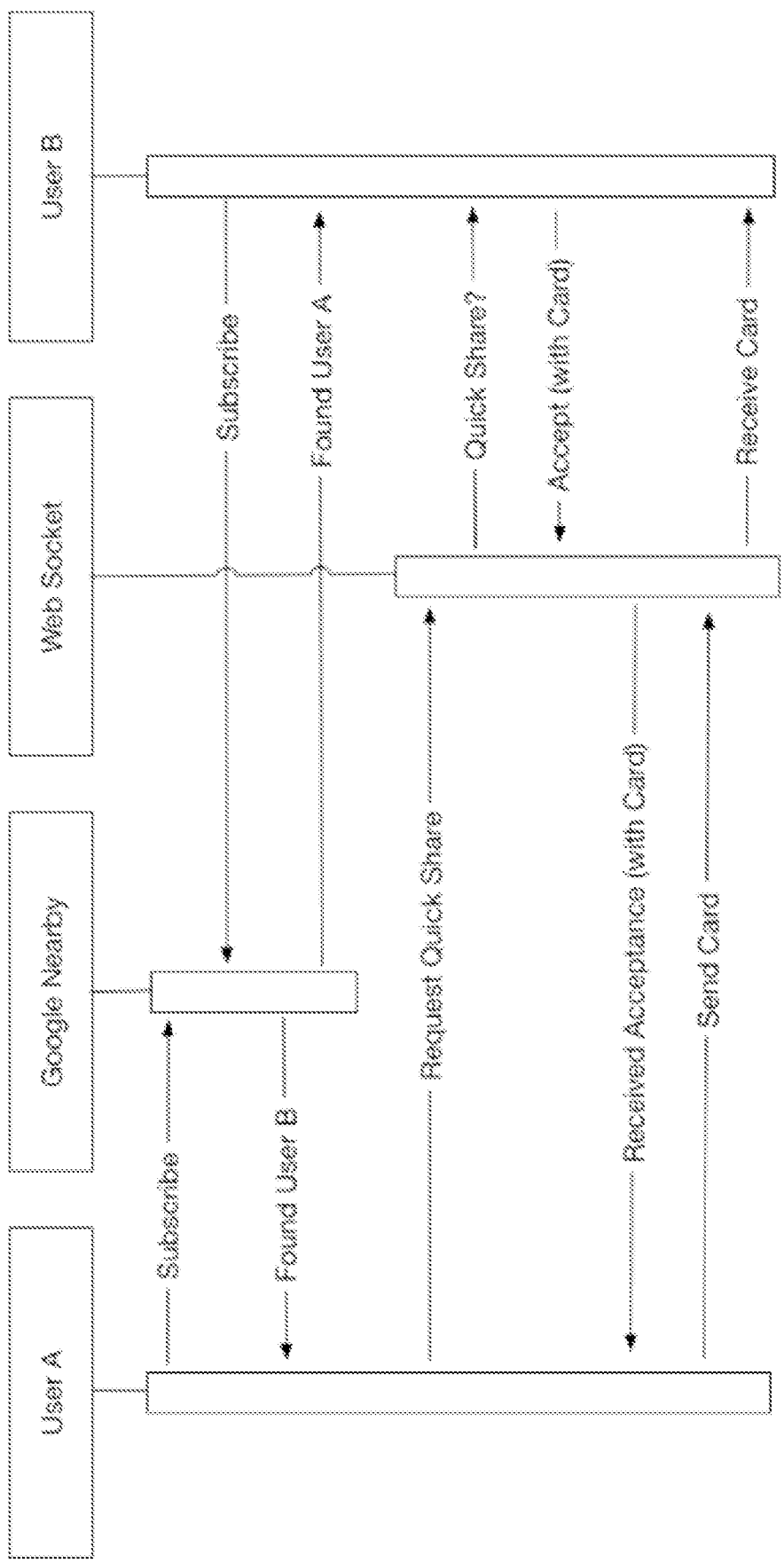

The sequence flow of the software for creating and actioning a quick sharing of business card information between two users as part of the QUICK SHARE functionality is shown in the sequence diagram of FIG. 6B of the drawings.

The operation of the App code for the QUICK SHARE functionality is more particularly described using pseudo-code as follows:

Quick Share

Once a device is discovered, you now have the ability to send a quick share request directly to that device instead of creating a meeting.

To send a quick share request the following message is sent to the Web Socket

```
{
    "command":"quick_share_cardex",
    "identifier":{
        "channel":"MeetingChannel"
    },
    "data":{
        "device_uuid":requested_user_device_uuid,
        "cardex_data":{
            "name":user_name,
            "companyName":user_company_name,
            "companyPosition":user_company_position,
            "mobileNumber":user_mobile_number,
            "emailAddress":user_email_address,
            "businessCardImage":user_business_card_image,
            "userProfilePicture":user_profile_picture,
            "companyAddress":user_company_address,
            "companyWebsite":user_company_website,
            "phoneNumber":user_phone_number,
            "faxNumber":user_fax_number,
            "facebookPageUrl":user_facebook_page_url,
            "instagramPageUrl":user_instagram_page_url,
            "twitterName":user_twitter_name,
            "linkedInName":user_linkekin_name
        }
    }
}
```

This socket message gets sent through the socket directly to the user with the device uuid that is set in the device uuid value The device that received the quick share request will receive a prompt notifying them that a user has requested to share cards with them.

The prompt says:

'{User} would like to swap cards'
[Accept] [Reject]

Accept Quick Share

If the user accepts the quick share request, they will send the following message to the socket

```
{
    "command":"quick_share_cardex",
    "identifier":{
        "channel":"MeetingChannel"
    },
    "data":{
        "device_uuid":requesting_user_device_uuid,
        "cardex_data":{
            "name":user_name,
            "companyName":user_company_name,
            "companyPosition":user_company_position,
            "mobileNumber":user_mobile_number,
            "emailAddress":user_email_address,
            "businessCardImage":user_business_card_image,
            "userProfilePicture":user_profile_picture,
            "companyAddress":user_company_address,
            "companyWebsite":user_company_website,
            "phoneNumber":user_phone_number,
            "faxNumber":user_fax_number,
            "facebookPageUrl":user_facebook_page_url,
            "instagramPageUrl":user_instagram_page_url,
            "twitterName":user_twitter_name,
            "linkedInName":user_linkekin_name
        }
    }
}
```

This socket message gets sent through the socket directly to the user that originally made the quick share request.

Reject Quick Share

If the user rejects the quick share request, they will send the following message to the socket

```
{
    "command":"reject_quick_share",
    "identifier":{
        "channel":"MeetingChannel"
    },
    "data":{
        "device_uuid":requesting_user_device_uuid,
    }
}
```

This socket message gets sent through the socket directly to the user that originally made the Quick Share request.

The interaction between the administrator user, a client service provider A user, an ordinary user and the API involving invoking of the COUPON functionality is set out in Table E below.

TABLE E

| Administrator | Service Provider A | Ordinary User | API |
|---|---|---|---|
| Admin Creates Client in CMS | | | |
| Admin Creates Beacon in CMS | | | |
| Admin assigns Beacon to Client | | | |
| | Client creates Cardex and Coupon | | |
| | Client assigns Cardex and Coupon to Beacon | | |
| | Client installs Beacon at physical location | | |
| | | User walks within range of physical location where beacon is situated | |
| | | User receives push notification from Client | |
| | | User requests beacon information from API | |
| | | | API returns beacon information including cardex and coupon to User |
| | | | API saves copy of cardex and coupon to the User |
| | | User will now have cardex and coupon allocated to them and visible in the application | |
| | | User shows coupon to client to redeem | |

The operation of the App code for the COUPON functionality is more particularly described using pseudocode as follows:

Beacons
    When the app launches, the device will begin to range for all beacons with the UUID of the system.
    This UUID is unique to the system and all beacons used by the system will have this UUID assigned to them
    When a device comes into range of a beacon, the device will receive a notification with the beacon UUID, major Id and major Id
    Once the device receives the notification, it will make a request to the API to get the beacon data
    To receive the data the device makes the following request:
        GET http address of the software development kit (SDK) (a data development cloud storage facility) with the following data

```
{
    "Minor_id":beacon_minor_id,
    "Major_id":beacon_major_id
}
```

The API will return a success and provide the cardex and the coupons linked to that beacon User Data
    When the user taps on the Cardex or Coupons tab in the app they will need to get the updated data from the API for the user
    This will be all the cardex cards that the user has received via meetings, quick share and beacons and all the coupons that the user has received from beacons
    To get the latest data the user makes the following request to the API:
        GET http address for current profile
        This will return the users latest data including a list of all their cardex cards and coupons.
        This will be used to display a list on both the Cardex and Coupons tab.

Figure 3C:
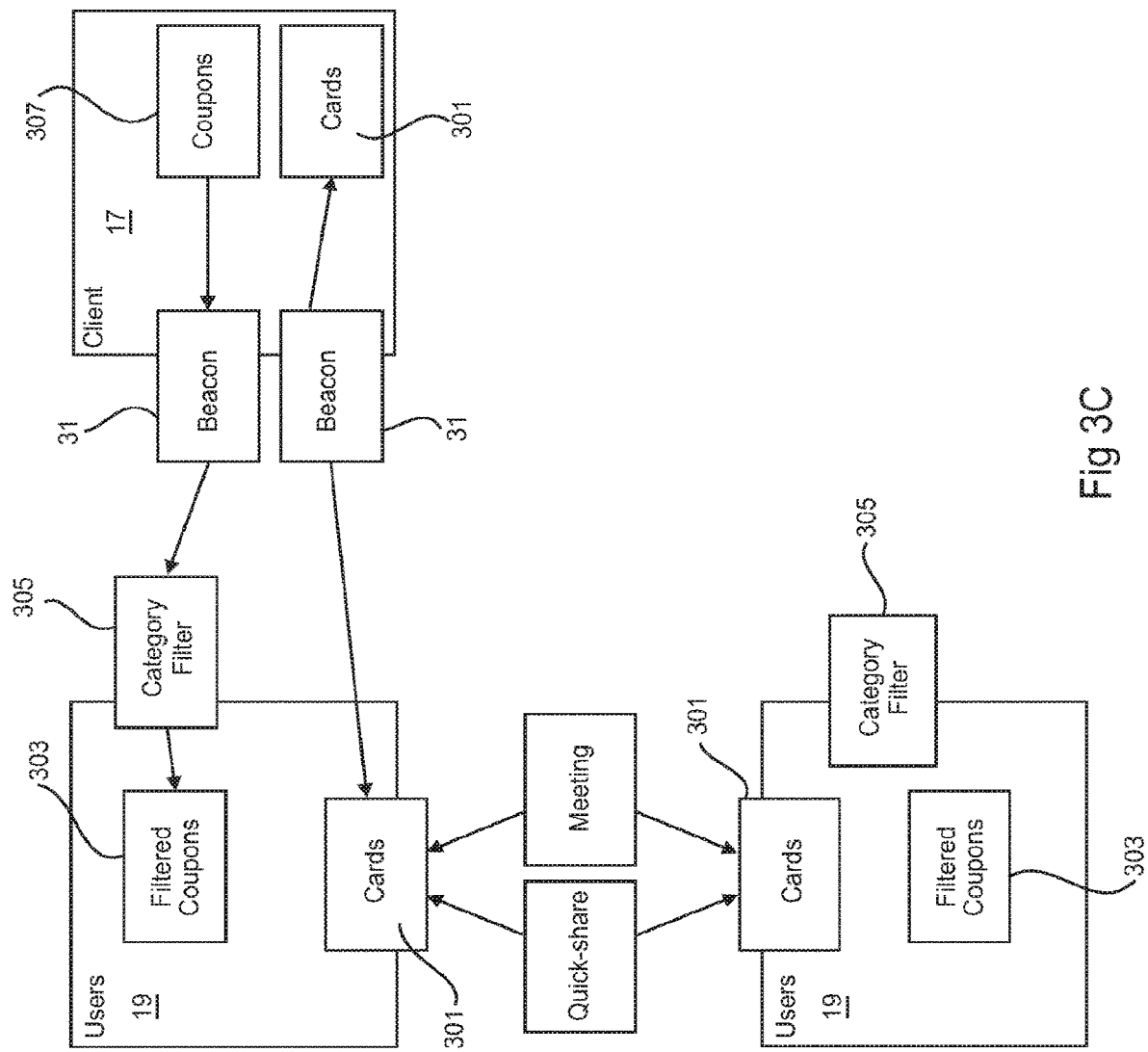

In the light of the above, the overall system architecture can now be understood by reference to FIG. 3C, showing how a user 19 communicates with other users via the MEETINGS functionality 25/45 and the QUICK SHARE functionality 26, as well as providing an overview of how a client 17 shares coupons 33 and cards 37 for use by a user using the COUPONS functionality 27 and BUSINESS CARDS functionality 24/43/44.

Moreover, each user 19 and client 17 has a repository or store 301 for cards 37, each user has a repository or store 303 for filtered coupons 33, and a category filter process 305 for filtering coupons received from a client using categories 35 provided by the system and set by the user. Each client 17, has a repository or store 307 for locating coupons 33 designed and for issuing or distributing or disseminating by them through associated beacons 31.

Figure 3D:
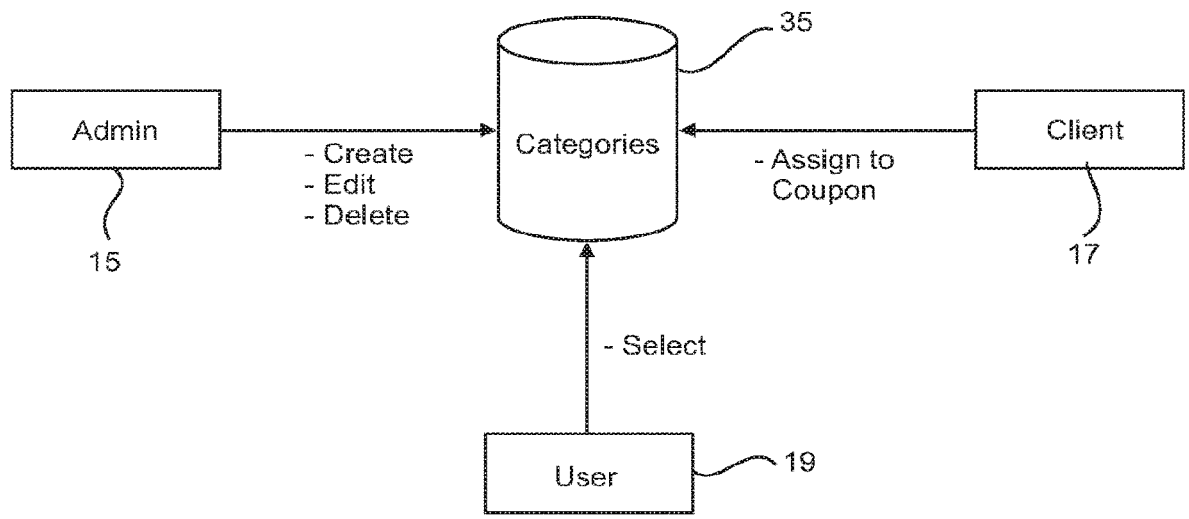

The basic lines of communication between the various actors of the system, namely the administrator 15, clients 17 and users 19 concerning categories 35 and the ability of each to communicate with categories is shown in FIG. 3D.

Moreover, an admin entity 15 is able to create, edit and delete categories 35, a client 17 is able to assign a category to a coupon 33, and a user 19 is able to just select a category.

Figure 3E:
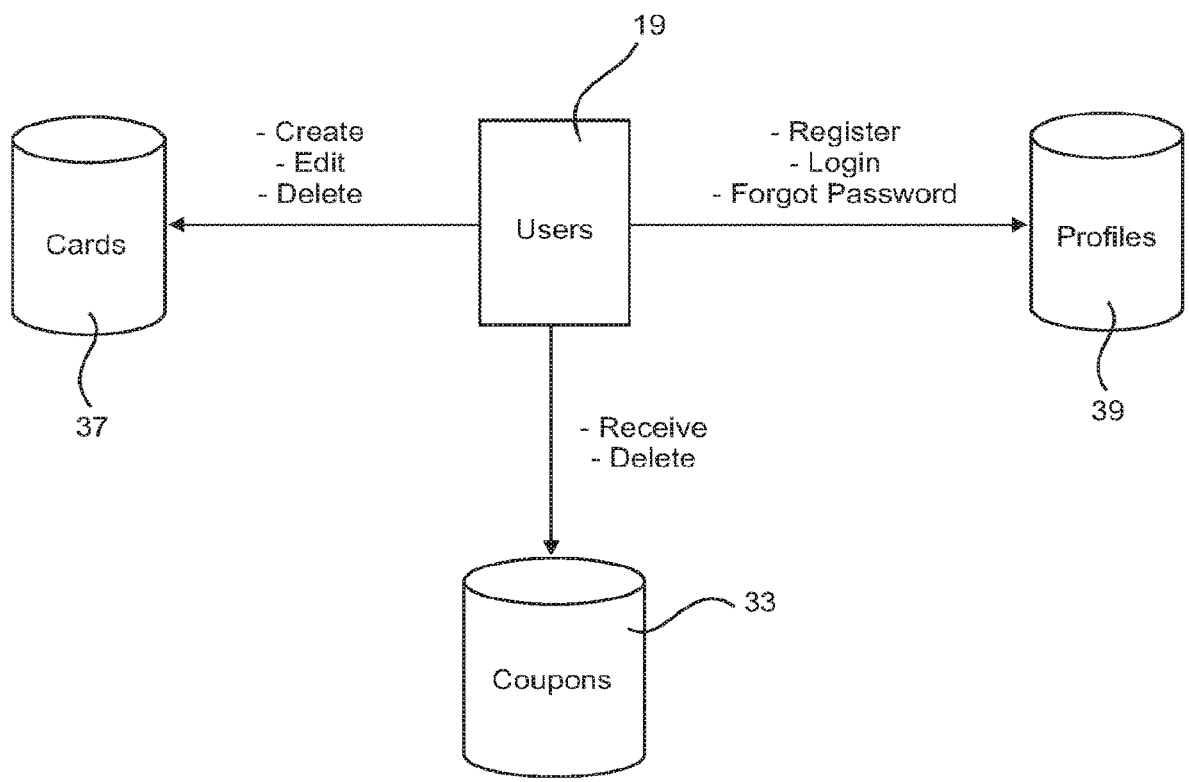

As can be appreciated, the structure involving communication with the various databases or repositories or stores of contact information in the form of user profiles 39 and cards 37, and content including notifications in the form of coupons 33, is important to the operation of the system. As shown in FIG. 3E, the system is programmed so that a user 19 is able to: (i) create, edit and delete cards 37; (ii) receive and delete coupons 33; and register, login and accommodate forgotten password to access user profiles 39.

Figure 7:
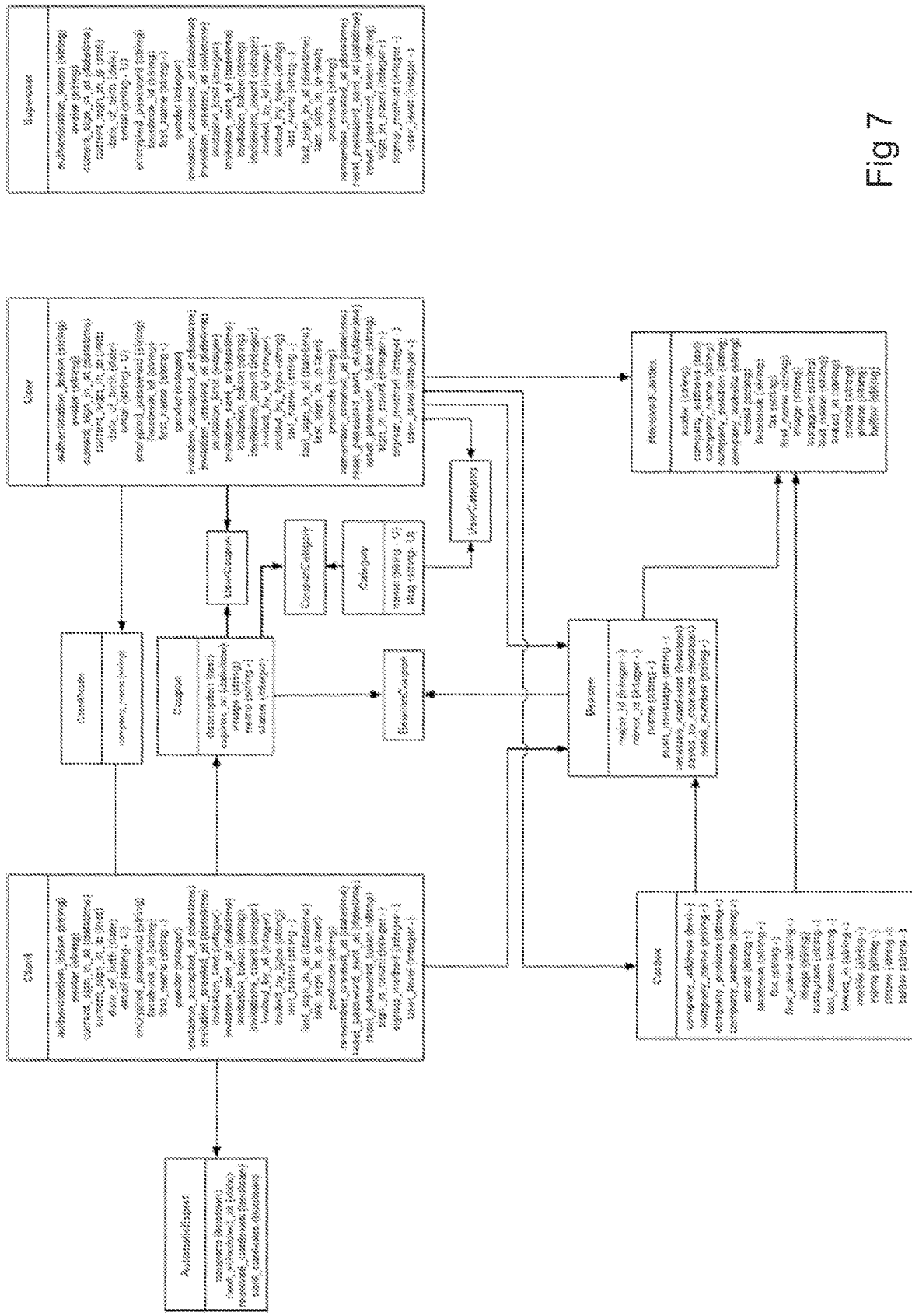
FIG. 7 is a domain model diagram showing the configuration of the database.

The complete database visualisation provided on the server, and the properties of the that each database contains are illustrated by way of the domain or class model diagram of FIG. 7. As shown, class names listing variables or attributes include: Client; User; Beacon; Cardex; Coupon; Category. Client maps to AutomaticExport, Beacon, Coupon and ClientDetails. User maps to ClientDetails, UserCoupon, UserCategory, Cardex, Beacon and ReceivedCardex. Cardex maps to Beacon and ReceivedCardex. Beacon maps to ReceivedCardex and BeaconCoupon. Coupon maps to BeaconCoupon, UserCoupon and CouponCategory. Finally, Category maps to CouponCategory and UserCategory. The database also includes a Supervisor class.

Figure 6C:
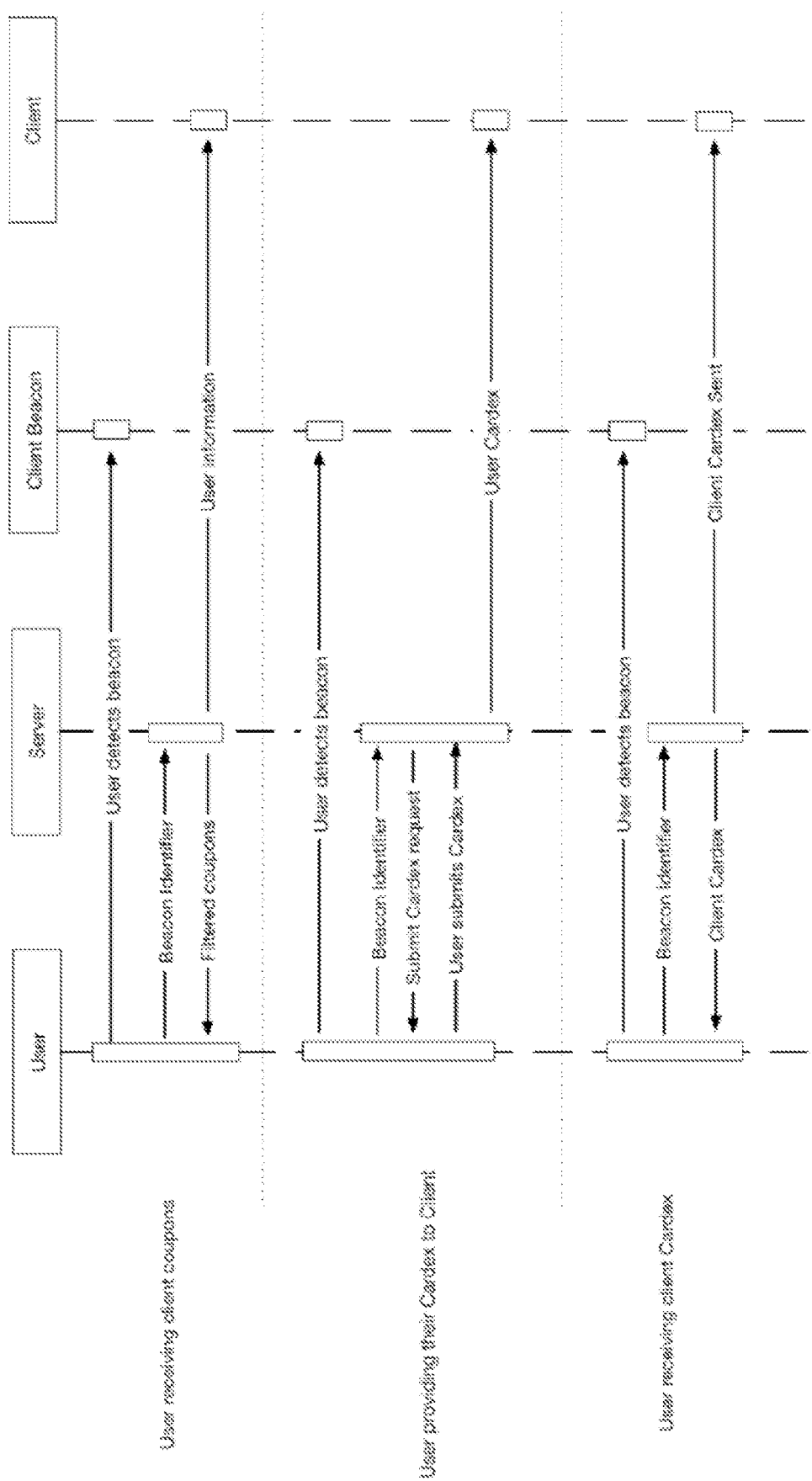

The simplified sequence indicating how the system is programmed for users 19 to be able to receive coupons 33 from clients 17 via beacons 31 is shown in FIG. 6C. The relevant entities are User, Server, Client Beacon and Client, and the scenarios are: (1) User receiving client coupons; (2) User providing their cardex to Client; and (3) User receiving client cardex.

Figure 6D:
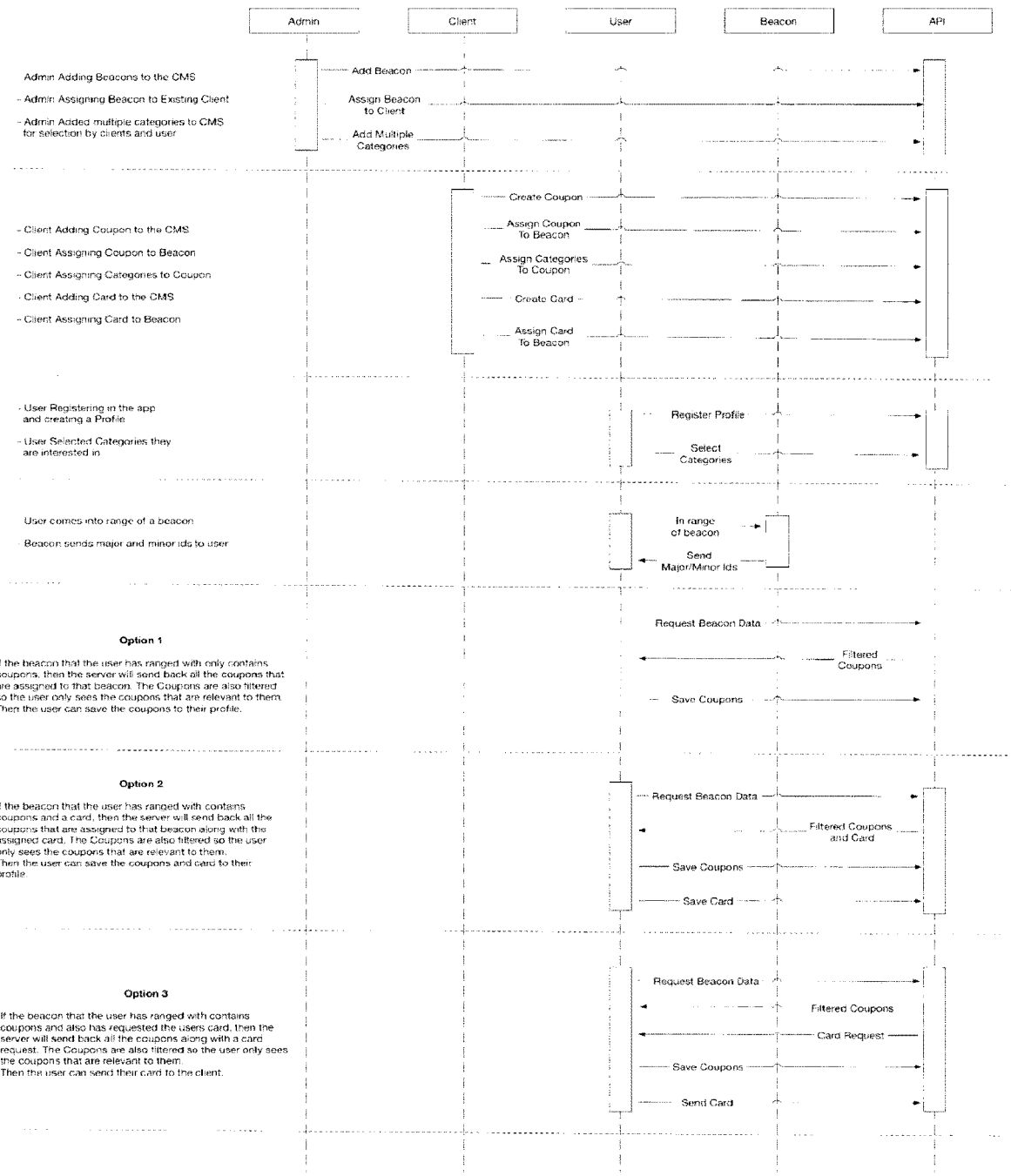

A more detailed sequence indicating how the system is programmed for coupons and cards to be shared between clients and users is shown in FIG. 6D. The sequence starts by showing how an admin entity creates beacons and assigns them to clients, through to category selection, beacon ranging and then the different ways that coupons are shared via beacons.

With the latter, three options are provided:
(1) If the beacon that the user has ranged with only contains coupons, then the server will send back all the coupons that are assigned to that beacon. The coupons are also filtered so the user only sees the coupons that are relevant to them. Then the user can save the coupons to their profile.
(2) If the beacon that the user has ranged with contains coupons and a card, then the server will send back all the coupons that are assigned to that beacon along with the assigned card. The coupons are also stored so the user only sees the coupons that are relevant to them. Then the user can save the coupons and card to their profile.
(3) If the beacon that the user has ranged with contains coupons and also has requested the user's card, then the server will send back all the coupons along with a card request. The coupons are also filtered so the user only sees the coupons that are relevant to them. Then the user can send their card to the client.

It should be appreciated that the scope of the present invention is not limited to the specific embodiment described as the best mode for carrying out the invention. Changes and modifications to the App, system and methodology described that achieve the same outcome of the present invention are envisaged to form part of the invention and do not detract from it.

The invention claimed is:
1. A contact information exchanging and content system for networking including:
    smart devices for users and clients being part of a network of the contact information exchanging and content system, each smart device having:
- a unique user identifier to identify the smart device as a user device for a user, or a unique client identifier to identify the smart device is a client device for a client;
- a user interface for communicating with a user operator of the smart device, or a client interface for communicating with a client operator of the smart device, a network interface for communicating with the network, a processor for operating an application, and a store;
- a server including an engine and a database; and
- a box associated with a client, the box using a beacon protocol to broadcast a unique client identifier received by the smart device over the network and a unique beacon identifier of the box that are broadcast within range of the box to a responding user device entering the range and responding to a push notification from the box,
- whereby acceptance of the client identifier and the beacon identifier by the responding user device selectively causes contact information or content or both contact information and content to be pushed by the box to the responding user device and the client identifier and the beacon identifier to be assigned to the user device;
- the store of a user device being designed to store:
  - (i) contact information related to the user of the user device,
  - (ii) contact information of other user devices of the network, and
  - (iii) selectively received pushed content;
- the application of a user device having:
  - (a) contact functionality to:
    - (i) generate and store the user contact information via the user interface of the user device of the user;
    - (ii) receive and store the contact information of another user via the network interface; and
    - (iii) communicate the user contact information via the network interface to the server for processing by the engine to form a contact information data file and store the contact information data file in the database; and
  - (b) content functionality to:
    - (i) selectively receive beacon identifiers; and
    - (ii) selectively receive and store content pushed to the user device after receipt of a selected beacon identifier; and
    - (iii) communicate the stored content via the network interface to the server interface for processing by the engine to form a content data file and store the content data file in the database;
- the application of a client device having functionality to:
  - (i) generate client content for receipt by a user device via the server; and
  - (ii) communicate the client content via the network interface to the server for processing by the engine to form a content data file and store the content data file in the database;
- wherein the network includes members that include the user of the user device and other users of user devices with user identifiers that are assigned client and beacon identifiers for the members to indicate through their respective user devices when communicating to each other and the server that they are members of the network;
- the engine being programmed to:
  - (i) receive, from the user devices of the members, their respective user identifiers, assigned client identifiers and assigned beacon identifiers to identify that their respective users are members of or are to be associated with the network and establish communication therewith, according to the particular functionality being invoked and store the user identifiers, the assigned client identifiers and the assigned beacon identifiers within corresponding data files within the database;
  - (ii) receive the user contact information and client content from the network interface and respectively process same to form corresponding data files that include a contact information data file and a content data file and securely store the corresponding data files in the database;
  - (iii) based on editing, at the user interface of the user device, of either content associated with the box or contact information, selectively cause:
    - (a) stored contact information associated with the user of the user device in respect of which a user identifier is received to be accessed from the corresponding data file within the database and downloaded to the user device; and
    - (b) stored content associated with the client device of the box in respect of which beacon identifiers are received in conjunction with a user identifier to be pushed and downloaded to the user device associated with the user identifier from the corresponding data file within the database.

2. A system as claimed in claim 1, wherein the engine is programmed to push selected content associated with a client device to a user device accepting a beacon identifier from the box and sending the user identifier of the user device in conjunction with the beacon identifier of the box to the server upon receipt of the user identifier and the beacon identifier.

3. A system as claimed in claim 1, wherein contact functionality includes one or more of:
- (i) card exchanging;
- (ii) meetings; and
- (iii) quick share.

4. A system as claimed in claim 1, wherein the engine is programmed to selectively cause:
- (i) stored contact information associated with the user of the user device in respect of which a user identifier is received to be accessed and downloaded to the user device; and
- (ii) stored content associated with the client of the beacon in respect of which beacon identifiers are received in conjunction with a user identifier to be pushed and downloaded to the user device associated with the user identifier.

5. A system as claimed in claim 1, wherein the engine is programmed based on a selection at the user interface of a responding user device for:
- assignment to a type of content to be received at the user device,
  - (i) based on editing of at least content associated with the client device at the user interface of the user device for assignment to a type of content to be received at the user interface, to selectively cause:

stored content associated with the client target in respect of which beacon identifies are received in conjunction with a target user identifier to be pushed and downloaded to the responding user device associated with a user identifier from a corresponding data file within the database; or (ii) based on editing of at least contact information associated with a client user at the user interface of a client user device for assignment to all boxes associated with the client user, to selectively cause:

stored contact information associated with the client user of the client user device to be accessed within the corresponding data file within the database and stored in all beacon devices having a beacon identifier associated with the client user.

6. An application for a smart device of a user or a client being part of a contact information exchanging and content system for networking, the contact information exchanging and content system comprising a network, a server including an engine and a database, a box associated with a client, and the smart device, the smart device having:
  a unique user identifier to identify the smart device as a user device for a user, or a unique client identifier to identify the smart device is a client device for a client, a user interface for communicating with an operator of the smart device, a network interface for communicating with the network, a processor for operating the application, and a store;

the application of a user device including:
  (a) contact functionality to:
    (i) generate and store user contact information via the user interface of the user device of a user;
    (ii) receive and store the contact information of another user via the network interface; and
    (iii) communicate the user contact information via the network interface to a server for processing to form a contact information data file and store the contact information data file in a database; and
  (b) content functionality to:
    (i) selectively receive a client identifier and a beacon identifier from a box associated with a client, the box using a beacon protocol to broadcast the client identifier and the beacon identifier to the user device when it is within range of the box;
    (ii) selectively receive and store content pushed to the user device upon accepting the client identifier and the beacon identifier, wherein the client identifier and the beacon identifier are assigned to the user device upon accepting the client identifier and the beacon identifier; and
    (iii) communicate the stored content via the network interface to the server for processing by the engine to form a content data file and store the content data file in the database;

the application of a client device including:
  functionality to:
    (i) generate client content for receipt by a user device via the server; and
    (ii) communicate the client content via the network interface to the server for processing by the engine to form a content data file and store the content data file in the database;

wherein the network includes members that include at least the user of the user device, and the user device transmits the user identifier, the assigned client identifier and the assigned beacon identifier to the server to identify that the user is a member of or is to be associated with the network and establish communication therewith.

7. A smart device for a user or a client being part of a contact information exchanging and content system for networking, the contact information exchanging and content system comprising a network, a server including an engine and a database, a box associated with a client, the smart device including:
  a unique user identifier to identify the smart device as a user device for a user, or a unique client identifier to identify the smart device is a client device for a client;
  a user interface for communicating with a user operator of the user device or a client interface for communicating with a client operator of the client device, a network interface for communicating with a computer network, a processor for operating an application, and a store;

wherein the application of a user device comprises:
  (a) contact functionality to:
    (i) generate and store user contact information via the user interface of the user device of a user;
    (ii) receive and store the contact information of another user via the network interface; and
    (iii) communicate the user contact information via the network interface to a server for processing to form a contact information data file and store the contact information data file in a database; and
  (b) content functionality to:
    (i) selectively receive a client identifier and a beacon identifier from a box associated with a client, the box using a beacon protocol to broadcast the client identifier and the beacon identifier to the user device when it is within range of the box;
    (ii) selectively receive and store content pushed to the user device upon accepting the client identifier and the beacon identifier, wherein the client identifier and the beacon identifier are assigned to the user device upon accepting the client identifier and the beacon identifier; and
    (iii) communicate the stored content via the network interface to the server for processing by the engine to form a content data file and store the content data file in the database;

the application of a client device including:
  functionality to:
    (i) generate client content for receipt by a user device via the server; and
    (ii) communicate the client content via the network interface to the server for processing by the engine to form a content data file and store the content data file in the database;

wherein the network includes members that include at least the user of the user device, and the user device transmits the user identifier, the assigned client identifier and the assigned beacon identifier to the server to identify that the user is a member of or is to be associated with the network and establish communication therewith.

8. A method for networking contact information and contact involving a plurality of network members that comprise:
  (i) a user device for a user able to use the method with respect to both contact information and content, (ii) a client device for a client able to use the method for pushing content to users and (iii) a beacon associated with a client to enable the pushing, the method comprising:
- communicating by a network server with the network clients, including:
  - assigning a client identifier and beacon identifier to all network members, wherein the network members include the user of the user device and other users of user devices with user identifiers that are assigned client and beacon identifiers for the members to indicate through their respective user devices when communicating to each other and the network server that they are members of the network;
  - in the user device, selectively receiving, storing and updating:
    - (i) contact information related to the user of a user device, and
    - (ii) contact information related to one or more users of other user devices accepted by the user;
  - selectively receiving a user identifier of another user in exchange for supplying contact information of the user of the user device to the user device of the other user; and
  - ranging for a client identifier of a box associated with a client for receiving beacon identifiers of the box;
  - after receiving the beacon identifier, opening communications with the network server and sending the user identifier and the beacon identifier to the network server; and
  - selectively receiving contact information associated with the user and content of the client associated with the beacon from the network server;
- in the client device:
  - selectively sending a client identifier to the network server to enable a client to access content associated with prescribed beacons of the client stored on the network server;
- in the beacon:
  - ranging the client identifier to user devices within a range of the beacon, and in response to a user device during the ranging, sending the beacon identifiers to the user device;
- in network server:
  - receiving from the user devices of the members, their respective user identifiers, assigned client identifiers and assigned beacon identifiers to identify that their respective users are members of or are to be associated with the network and establish communication therewith according to the particular functionality being invoked;
  - securely storing contact information of users and content of clients by way of direct communication with user devices of users and client devices of clients after establishing communications therewith; and
  - permitting access thereto by prescribed network clients according to the particular functionality being invoked;
  - selectively causing:
    - (i) stored contact information associated with the user of the user device in respect of which a user identifier is received to be accessed and downloaded to the user device; and
    - (ii) stored content associated with the client of the box in respect of which beacon identifiers are received in conjunction with a user identifier to be pushed and downloaded to the user device associated with the user identifier.

9. A method as claimed in claim 8, wherein in the user device: supplying contact information of the user to the user device of the other user is provided by way of the server; and receiving content of the client is pushed by the server.

* * * * *